United States Patent
Mori et al.

(10) Patent No.: US 6,782,785 B2
(45) Date of Patent: Aug. 31, 2004

(54) CUTTER CASSETTE AND CUTTING DEVICE

(75) Inventors: Makoto Mori, Katsushika-ku (JP); Fumio Shimizu, Katsushika-ku (JP)

(73) Assignee: Carl Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/073,176

(22) Filed: Feb. 13, 2002

(65) Prior Publication Data

US 2002/0112586 A1 Aug. 22, 2002

(30) Foreign Application Priority Data

Feb. 16, 2001 (JP) ........................................ 2001-040560

(51) Int. Cl.[7] .................................................. B26D 1/04
(52) U.S. Cl. .............................. 83/563; 83/614; 83/629
(58) Field of Search .............................. 83/DIG. 1, 563, 83/629, 614, 455; 30/162

(56) References Cited

U.S. PATENT DOCUMENTS

| 3,740,848 A | * | 6/1973 | Lindley ........................ 30/319 |
| 5,332,001 A | | 7/1994 | Brown |
| 5,996,459 A | | 12/1999 | Cornell et al. |
| 6,249,975 B1 | * | 6/2001 | Lin .............................. 30/162 |
| 6,438,850 B2 | * | 8/2002 | Young et al. ................. 30/162 |
| 6,540,451 B1 | * | 4/2003 | Mori |

FOREIGN PATENT DOCUMENTS

JP            A 2000-42979            2/2000

* cited by examiner

*Primary Examiner*—Kenneth E. Peterson
(74) *Attorney, Agent, or Firm*—Oliff & Berridge, PLC

(57) ABSTRACT

A cutter cassette includes a cutter case for holding a cutting blade slidably in a case holder. The cutter cassette further includes a holding mechanism for holding the cutter case in a completely inserted state and an extending mechanism for protruding the cutter case from the case holder. The cutting blade is held in the holding mechanism when not used, and is promptly ejected by the extending mechanism when used. A cutting device mounted on a rail and a portable hand-operated cutter are also provided. Preferably, the cutting device includes a driving mechanism for shifting the cutting blade in the cutter cassette into an operative state in synchronization with the operation of pushing the cutter cassette.

17 Claims, 37 Drawing Sheets

CUTTER CASSETTE AND CUTTING DEVICE

BACKGROUND OF THE INVENTION

1. Field of the Invention

The present invention relates to a cutter cassette movably having a cutting blade therein and to a cutting device to which the cutter cassette is mounted for use.

2. Description of the Related Art

It is known in the art to provide cutting devices using cutting blades of various shapes as office equipment for cutting paper into a designated size at a time. Among such cutting devices are a cutting device which uses a circular rotary blade as a cutting blade to prevent displacements of paper when cutting. This type of cutting device often includes a slider on a guide rail. There is also a hand-operated cutter of a more compact and portable type for cutting paper, cloth, felt and the like without the need for the guide rail and the slider. In the conventional cutting devices, various improvements and inventions have been provided in order to ensure safety for cutting blades which are exposed in use. Particularly, cutting devices equipped with a safety cover or the like for avoiding the cutting blade from contacting with hand. However, since the safety cover or the like must be removed when mounting the cutting blade on the cutting device, some cutting devices cannot interchange the cutting blades speedily. Furthermore, when a portion of the cutting blade is exposed, extra caution on safety is required for interchanging work; accordingly, prompt work may not be ensured.

U.S. Pat. No. 5,996,459 discloses a cutting device having a slider on a guide rail, in which the slider is pivotally mounted on the guide rail in an upwardly perpendicular relation thereto, so that speedier cutting-blade interchanging work is provided. For example, U.S. Pat. No. 5,332,001 proposes a speedy cutting-blade interchange by forming a portion for housing a plurality of replacement blades on a base and by configuring the slider on the guide rail to be freely opened and closed. Furthermore, in a cutter cassette disclosed in Japanese Unexamined Patent Application Publication No. 2000-42979, in order to easily mount or interchange cutting blades without direct contact therewith, the cutting blade housed in a housing is covered by a protective plate which can be housed in the housing, thereby allowing the cutting blade to be covered or exposed as necessary and facilitating handling of the cutting blade. However, the cutting blades to be interchanged are prepared unprotected in any of these patents, so that the safety of users is not ensured. As described above, although the history of the invention for cutting-blade interchanging work of cutting devices is very old, many inventions and devices have been bound for a long time by a traditional viewpoint of interchanging exposed cutting blades.

SUMMARY OF THE INVENTION

The present invention is made in consideration of the above problems. Accordingly, it is an object of the present invention to provide a cutter cassette in which a whole cutting blade is housed and held therein when not used, and the cutting blade is protruded promptly when used, and to provide a cutting device using the cutter cassette.

In order to solve the above problems, according to a first aspect of the invention, a cutter cassette movably holds a cutting blade therein.

With such a configuration, the cutting blade can be promptly extended from the cutter cassette when used, that is, in an operative state.

In the invention according to a second aspect of the invention, a cutter cassette singly holds the cutting blade therein in a completely inserted state.

With such a configuration, the cutting blade can be securely housed and held in the cutter cassette when not used, that is, in an inoperative state.

In the invention according to the first or the second aspect of the invention, the cutter cassette includes a holding mechanism for holding the cutting blade therein in a completely inserted state, and an extending mechanism for extending the cutting blade outwardly.

With such a configuration, the cutting blade can be housed in the cutter cassette by using the holding mechanism in an inoperative state, and the cutting blade in the cutter cassette can easily be extended using the release mechanism and the extending mechanism in an operative state, thereby improving safety and operability.

In the invention according to a third aspect of the invention, a cutter cassette includes a cutter case for supporting a cutting blade, and a case holder for movably housing the cutter case therein.

With such a configuration, the cutting blade can easily be held in the case holder by using the cutter case, and greater flexibility of positioning operation in the case holder and also various functions can be provided by providing various functions on the outer surface of the cutter case.

Furthermore, in the invention according to the third aspect of the invention, the cutter cassette further includes a holding mechanism for holding the cutter case in the case holder in a completely inserted state, and an extending mechanism for extending the cutter case out from the case holder so as to project the cutting blade from the case holder.

With such a configuration, by using the cutter cassette, in an inoperative state, the cutting blade can easily be housed in the cutter cassette by using the holding mechanism and, in an operative state, the cutting blade in the cutter cassette can be movably projected with greater flexibility of operation by using the release mechanism and the extending mechanism, thereby providing a cutter cassette having improved safety and operability.

In the cutter cassette according to the third aspect of the invention, the cutter case includes a first protrusion protruding outwardly, and the case holder includes a second protrusion protruding inwardly, wherein the first protrusion and the second protrusion are engaged with each other to form the holding mechanism for holding the cutter case in the case holder in a completely inserted state.

With such a configuration, the holding mechanism can be configured simply by using the two protrusions.

In the cutter cassette according to the third aspect of the invention, the case holder further includes a third protrusion protruding outwardly or inwardly, pushes the first protrusion inwardly by the third protrusion, and disengages the first protrusion from the second protrusion, thereby constituting a release mechanism for releasing the holding mechanism.

With such a configuration, the release mechanism can be configured simply by using the three protrusions.

In the cutter cassette according to the third aspect of the invention, the holding mechanism is a spring engaged with the cutter case and the case holder, and the cutter case is held in the case holder in a completely inserted state by the elasticity of the spring.

With such a configuration, the holding mechanism can be configured simply by using the spring.

In the cutter cassette according to the third aspect of the invention, the holding mechanism is magnets each engaged with the cutter case and the case holder, and the cutter case is held in the case holder in a completely inserted state by the attraction of the magnets.

With such a configuration, the holding mechanism can be configured simply by using the magnets.

In the cutter cassette according to the third aspect of the invention, the holding mechanism is implanted hair engaged with the cutter case and the case holder, and the cutter case is held in the case holder in a completely inserted state by the friction of the implanted hair.

With such a configuration, the holding mechanism can be configured simply by using the implanted hair.

In the cutter cassette according to any one of the first to the third aspect of the invention, the extending mechanism extends the cutting blade in synchronization with an external driving mechanism.

With such a configuration, the extending mechanism of the cutter cassette according to the invention can extend the cutting blade by using the driving mechanism mounted to a cutting device. Furthermore, the cutting blade can be extended at the same time the cutter cassette according to the invention is mounted to the cutting device.

The cutter cassette according to any one of the first to third aspect of the invention further includes an opening on the outside surface for operating the extending mechanism by using the driving mechanism.

With such a configuration, the extending mechanism can be operated promptly by using the driving mechanism through the opening.

In the cutter cassette according to any one of the first to the third aspect of the invention, the extending mechanism includes a rack formed on the side of the cutter case, and the rack is formed in parallel with the opening formed on the side of the case holder.

With such a configuration, the cutting blade can be extended by operating the extending mechanism by using the cutter cassette in combination with the driving mechanism using a gear mechanism of the cutting device.

In the cutter cassette according to any one of the first to the third aspect of the invention, the extending mechanism includes a second rack formed on the side of the cutter case, wherein the first rack is formed in parallel with the opening formed on the side of the case holder, and wherein the second rack is formed in parallel with the first rack and closer to the center of the cutting blade than the first rack.

With such a configuration, the extending mechanism is operated by using the cutter cassette in combination with the driving mechanism using the gear mechanism of the cutting device to thereby increase the traveling distance of the cutter case as compared with that of the case holder, thereby extending the cutting blade.

The cutter cassette according to any one of the first to third aspect of the invention further includes an engaging portion with which a positioning member for positioning and fixing the cutter cassette in an operative state is engaged.

With such a configuration, safe operation of the cutter cassette can be ensured when used and cutting operation can be performed with stability.

A cutting device using the cutter cassette according to any one of the first to the third aspect of the invention includes a driving mechanism for shifting the cutting blade into an operative state when the cutter cassette is mounted to a cutter-cassette mounting portion of the cutting device.

With such a configuration, when the cutter cassette is inserted into the cutting device, the cutter cassette is detachably housed in the cutting device, and can be promptly discriminated via the cutter-cassette mounting portion. Moreover, the cutting blade in the cutter cassette can be shifted to an operative state by using the driving mechanism when the cutter cassette is pushed in, thereby setting the cutting device into an operative state.

In the cutting device using the cutter-cassette according to any one of the first to the third aspect of the invention, the driving mechanism includes at least one gear, and extends the cutter case in the case holder in synchronization with the operation of pushing the cutter cassette, thereby shifting the cutting blade into an operative state.

With such a configuration, for example, a multistage gear is used as a driving mechanism, and the traveling distance of the inner cutter case is increased as compared with that of the case holder, thereby allowing the cutting blade to shift to an operative state in synchronization with the pressure of the cutter cassette to the cutting device.

In the cutting device using the cutter cassette according to any one of the first to the third aspect of the invention, the driving mechanism includes at least one gear, and extends the cutter case in the case holder by using the mechanism after the cutter cassette has been pushed in, thereby shifting the cutting blade into an operative state.

With such a configuration, for example, a multistage gear is used as a driving mechanism to extend the cutter case in the case holder after the cutter cassette has been mounted in the cutting device, thereby allowing the cutting blade to project.

In the cutting device using the cutter cassette according to any one of the first to the third aspect of the invention, the driving mechanism includes an actuating rod in the cutting device and extends the cutter case in the case holder after the cutter cassette has been pushed in, thereby shifting the cutting blade into an operative state.

With such a configuration, by using the driving mechanism having the actuating rod in the cutting device, the cutter case is extended in the case holder after the cutter cassette has been mounted in the cutting device, thereby allowing the cutting blade to project. In this case, an engaging portion for positioning the cassette is unnecessary.

In the cutting device using the cutter cassette according to any one of the first to the third aspect of the invention, the driving mechanism includes an actuating rod on the side of the cutter cassette and extends the cutter case in the case holder in synchronization with the operation of pushing the cutter cassette, thereby shifting the cutting blade into an operative state.

With such a configuration, by using the driving mechanism having the actuating rod on the side of the cutter cassette, the cutting blade can be shifted to an operative state in synchronization with the operation of pushing the cutter cassette into the cutting device.

In the cutting device using the cutter cassette according to any one of the first to the third aspect of the invention, the driving mechanism is a cam groove in the cutting device; and the extending mechanism is a protrusion connected with a rotary blade provided on the cutter cassette; wherein the cam groove and the protrusion are engaged with each other in synchronization with the operation of pushing the cutter cassette, thereby shifting the cutting blade into an operative state.

With such a configuration, by using the cam groove provided in the cutting device as a driving mechanism, the cutting blade can be shifted to an operative state in synchronization with the operation of pushing the cutter cassette into the cutting device.

In the cutting device using the cutter cassette according to any one of the first to the third aspect of the invention, the external driving mechanism is driven manually.

With such a configuration, a complex driving mechanism is omitted, thereby providing a simple and economical cutting device.

While the cutter cassette and the cutting device using the cutter cassette according to the invention are principally configured as described above, other alternative mechanisms can be adopted as a holding mechanism, a release mechanism, and an extending mechanism to achieve the same object as that of the claims. However, the shapes of the cutter case and the case holder are modified in accordance with the embodiment in this case. The cutting blade according to the invention may be a knife-shaped blade or a rotary blade. The cutting function includes cutting in broken lines and in patterns, and striation. The cutting blade may be manually or automatically operated along with the cutter cassette for housing it. The gear mechanism according to the driving mechanism of the invention may constitute a gear train along with other plurality of gear mechanisms. Furthermore, the cutter cassette according to the invention is not limited only for desktop cutting devices. The cutting device may be a compact and portable manually-operated cutter. Moreover, cutting operation can be performed singly by the cutter cassette according to the invention.

DESCRIPTION OF THE PREFERRED EMBODIMENTS

Figure 1:
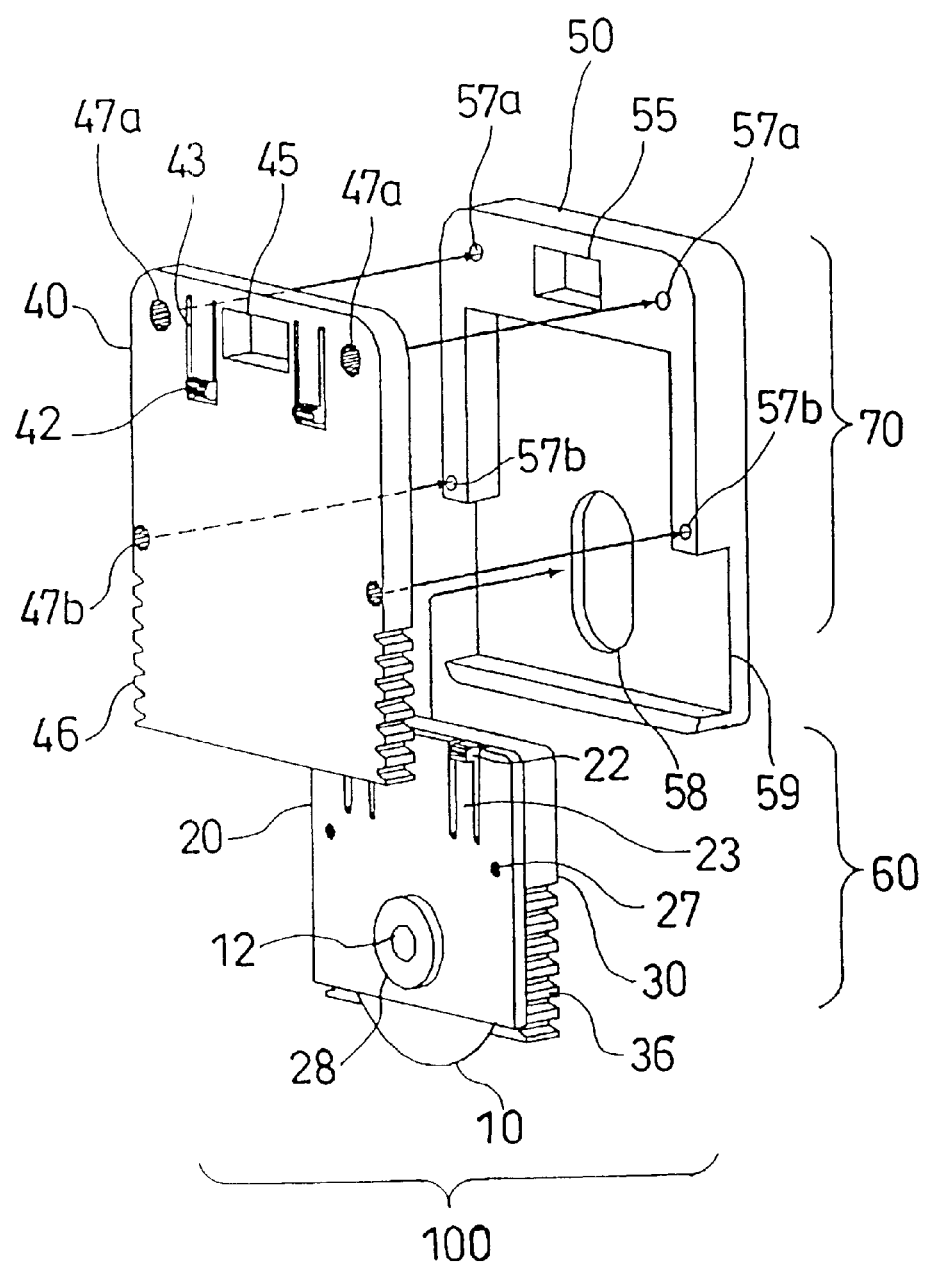
FIG. 1 is a perspective view showing the assembly of a cutter cassette having a rotary blade, according to a first embodiment of the present invention.
Figure 2:
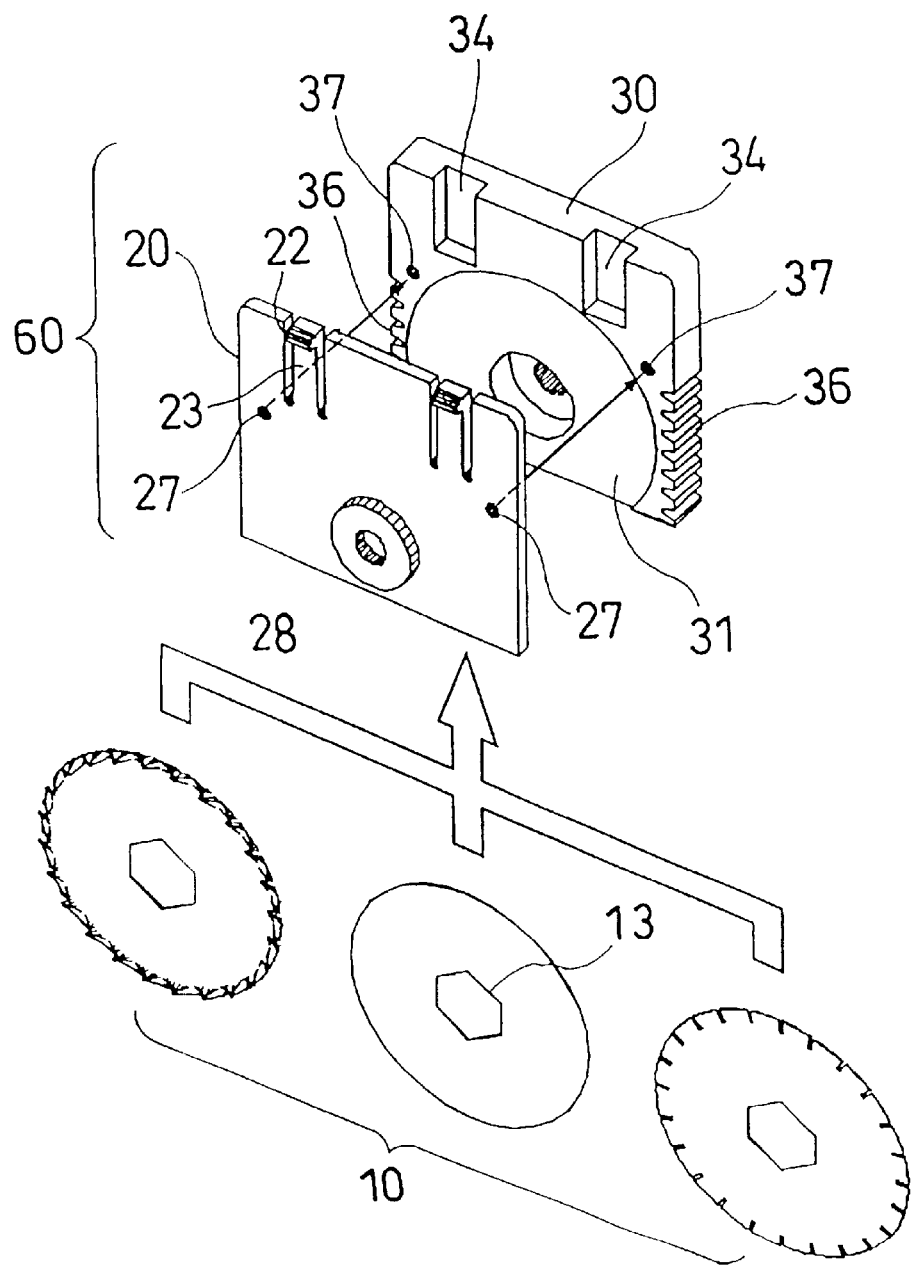
FIG. 2 is a perspective view showing the assembly of a cutter case when various cutting blades are mounted thereto, according to the first embodiment.
Figure 3:
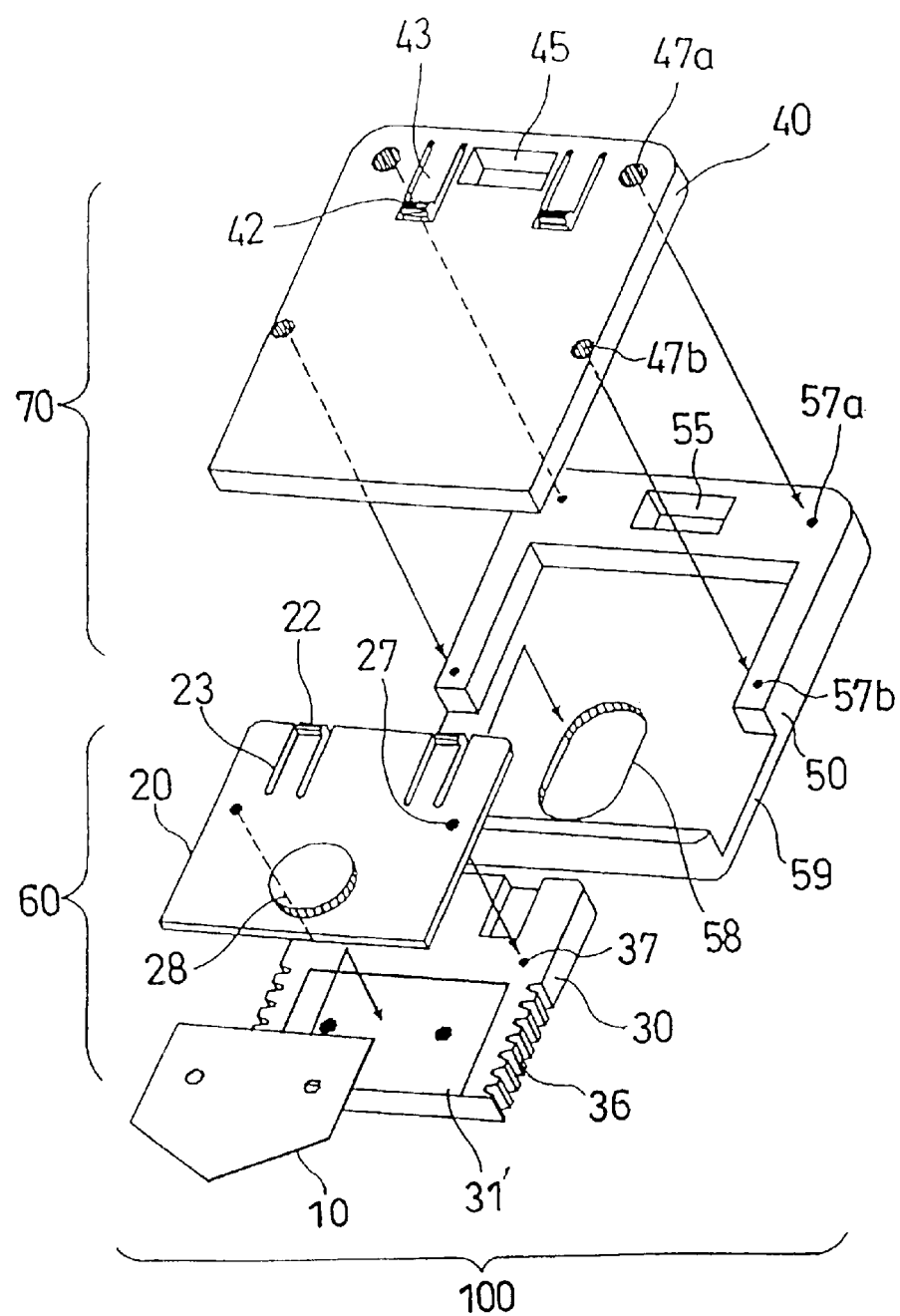
FIG. 3 is a perspective view showing the assembly of a cutter cassette having a knife-shaped cutting blade, according to the first embodiment.

Cutter cassettes according to embodiments of the present invention will be described hereinbelow with reference to appended FIGS. 1 to 27. Furthermore, cutting devices according to the embodiments of the invention will be described with reference to appended FIGS. 28 to 38. The words used in the invention are defined as follows:

cutting blade 10: a blade having the function of cutting or trimming cutter case 60: a supporting part for directly supporting the cutting blade 10 and, preferably, a case for covering the cutting blade 10 case holder 70: a case for housing and holding the cutter case 60 therein cutter cassette 100: a cutter cassette having at least the cutting blade 10 and, preferably, having the cutter case 60, the case holder 70, a holding mechanism and an extending mechanism cutting device 500: a cutting device to which the cutter cassette 100 is mounted and including a cutter and a hand-operated cutter for performing cutting operation First, referring to FIGS. 1 to 3, the cutting blade 10 according the embodiments of the invention will be specifically described.

Preferably, the cutter case 60 includes a rotary blade 10 as the cutting blade 10 therein (refer to FIG. 1). This is for the purpose of preventing transverse deflection of the cutting blade 10 during cutting operation. However, the type of rotary blade to be used is not limited to a straight blade. For example, various replacement blades including a perforating blade 10 for cutting in chain lines, a striating blade 10 for striating paper, a design blade 10 for cutting in various patterns are prepared (refer to FIG. 2). Furthermore, a cutting blade 10 such as a knife for cutting without rotation is also prepared (refer to FIG. 3). The shape of the knife is not limited to the shape shown in FIG. 3. In the strict sense, although the distinctions among such cutting blades 10 can be made, the cutting blade 10 according to the invention is not restricted by the difference of the shapes. In other words, the cutting blade 10 of the invention includes rotary blades and knifes according to various modifications. When the cutting blade 10 is described as a rotary blade 10 in the following description, the rotary blade 10 can be replaced by cutting blades 10 of other shapes at any time.

Next, referring to FIGS. 1 to 3, the cutter case 60 for directly housing the cutting blade 10 according to the embodiment of the invention will be specifically described.

The cutter case 60 according to a preferable embodiment is slidably housed between front and rear case pairs 40 and 50 of the case holder 70 (refer to FIGS. 1 to 3). Furthermore, the cutter case 60 includes the cutting blade 10 between front and rear case pairs 20 and 30 (refer to FIGS. 1 to 3). As described above, the cutter case 60 according to the invention includes various types of cutting blades 10, so that the inner shape of the cutter case 60 varies depending on the shapes of the cutting blades 10.

For example, in the case of the cutting blade 10 such as a rotary blade which performs cutting operation while rotating, the cutting blade 10 is rotatably engaged and supported in the cutter case 60 (refer to FIG. 1). In this case, the cutter case 60 includes a shallow recessed portion 31 for housing the cutting blade 10 along a circular shape thereof (refer to FIG. 2). In the case of the cutting blade 10 such as a knife which projects for cutting, the cutting blade 10 is engaged and supported in the cutter case 60 without rotating (refer to FIG. 3). In this case, the cutter case 60 includes a shallow recessed portion 31' for housing along the outline of the knife. The housing methods are different between the rotary blade which is rotatable and the knife which performs cutting without rotating, as shown in the drawings. Therefore, although the cutter case 60 according to FIG. 2 and the cutter case 60 according to FIG. 3 can be differentiated in the strict sense, the difference between them is not essential in the invention. In other words, various changes in the structure of the cutter cases 60 depending on the presence of rotary movement of the cutting blade 10 are within the scope of the cutter case 60 specified by the invention and they are within the concept of the invention. While bolts and a shaft 12 (refer to FIGS. 1 and 6) are omitted in FIGS. 2 and 3, the shaft 12 will be described later with reference to a side view of FIG. 6 and a front view of FIG. 11.

Subsequently, the cutter cassette 100 according to a first embodiment of the invention will be specifically described with reference to FIGS. 1 to 13.

As described above, the cutter cassette 100 according to the preferred embodiment of the invention includes the cutter case 60, the case holder 70, the holding mechanism, and the extending mechanism. As shown in FIG. 1, the cutter case 60 is constituted by the circular rotary blade 10 and the front and the rear case 20 and 30 which house the rotary blade 10 therein. The case holder 70 is constituted by the front and the rear case 40 and 50 which house the cutter case 60 therein. The rotary blade 10 is rotatably held along with the shaft 12 in the cutter case 60. The cutter case 60 is movably held in the case holder 70 longitudinally along a groove 58. Preferably, the front and the rear case 40 and 50 constituting the case holder 70 are combined by screws on the side opposite to the side from which the rotary blade 10 protrudes so that a portion of the rotary blade 10 can protrudes to the exterior by longitudinally sliding the cutter case 60 therein. The screwed portions are denoted by pairs of 47a, 47b, 57a and 57b (refer to FIG. 1). The case holder 70 may be combined by a method other than the method using the screws.

In the cutter cassette 100 according to the invention, the cutter case 60 can be omitted functionally. In this case, the shaft 12 (refer to FIG. 1) for supporting the rotary blade 10 is movably housed in the case holder 70.

Figure 6:
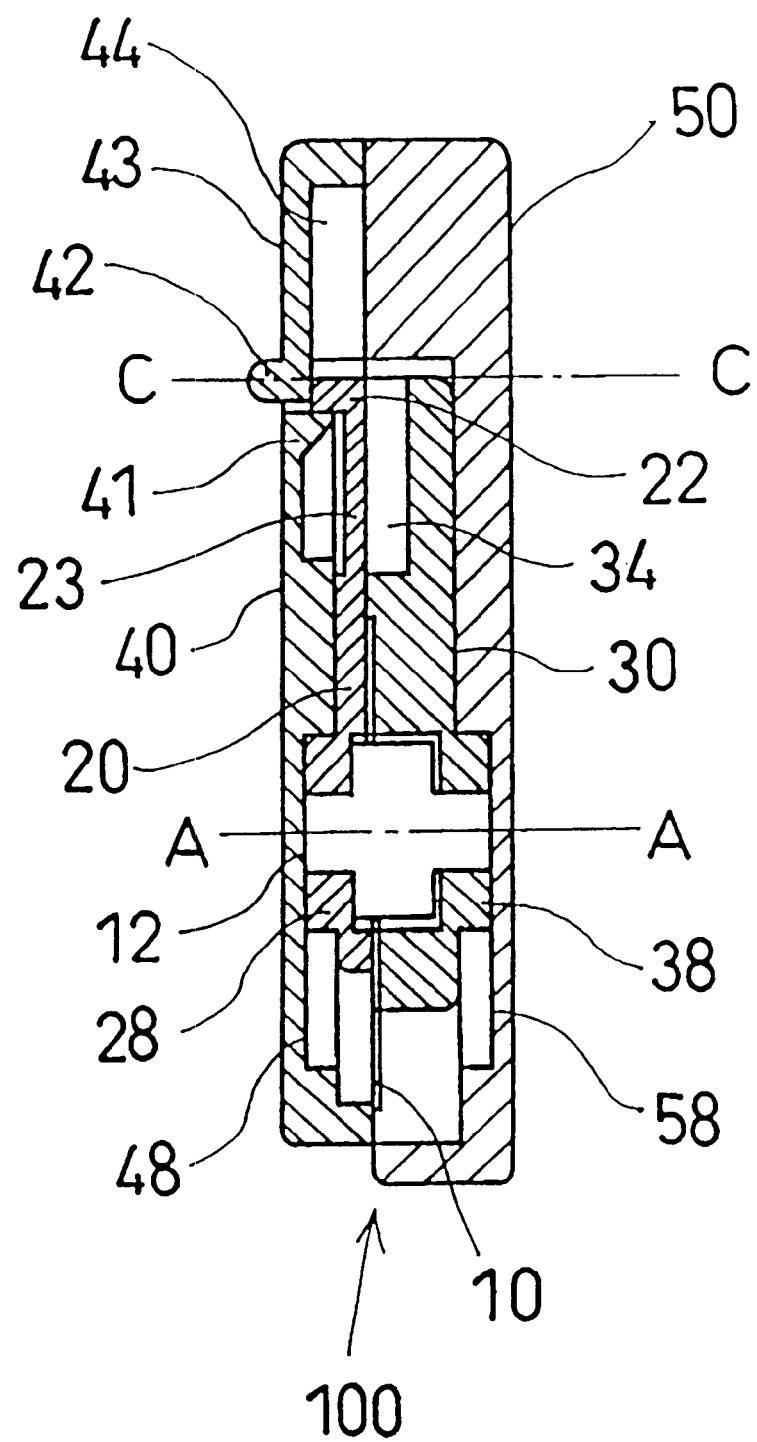
FIG. 6 is a sectional view of the cutter cassette in an inoperative state, according to the first embodiment.

As shown in FIG. 6, the cutter case cutter case 60, which rotatably supports the rotary blade 10 from front and behind, includes cylindrical protrusions 28 and 38 protruding backwardly and forwardly along the central axis of the rotary blade 10. The cylindrical protrusions 28 and 38 are positioned such that they are held in grooves 48 and 58 in the case holder 70. In other words, when the cylindrical protrusions 28 and 38 are positioned at the upper ends of the grooves 48 and 58 of the case holder 70 (refer to axis A—A in FIG. 4), the rotary blade 10 is completely housed in the case holder 70. When the cylindrical protrusions 28 and 38 are positioned at the lower ends of the grooves 48 and groove 58, which is longer than it is wide (refer to axis A'—A' in FIG. 5), only a part of the rotary blade 10 protrudes from the case holder 70.

Figure 4:
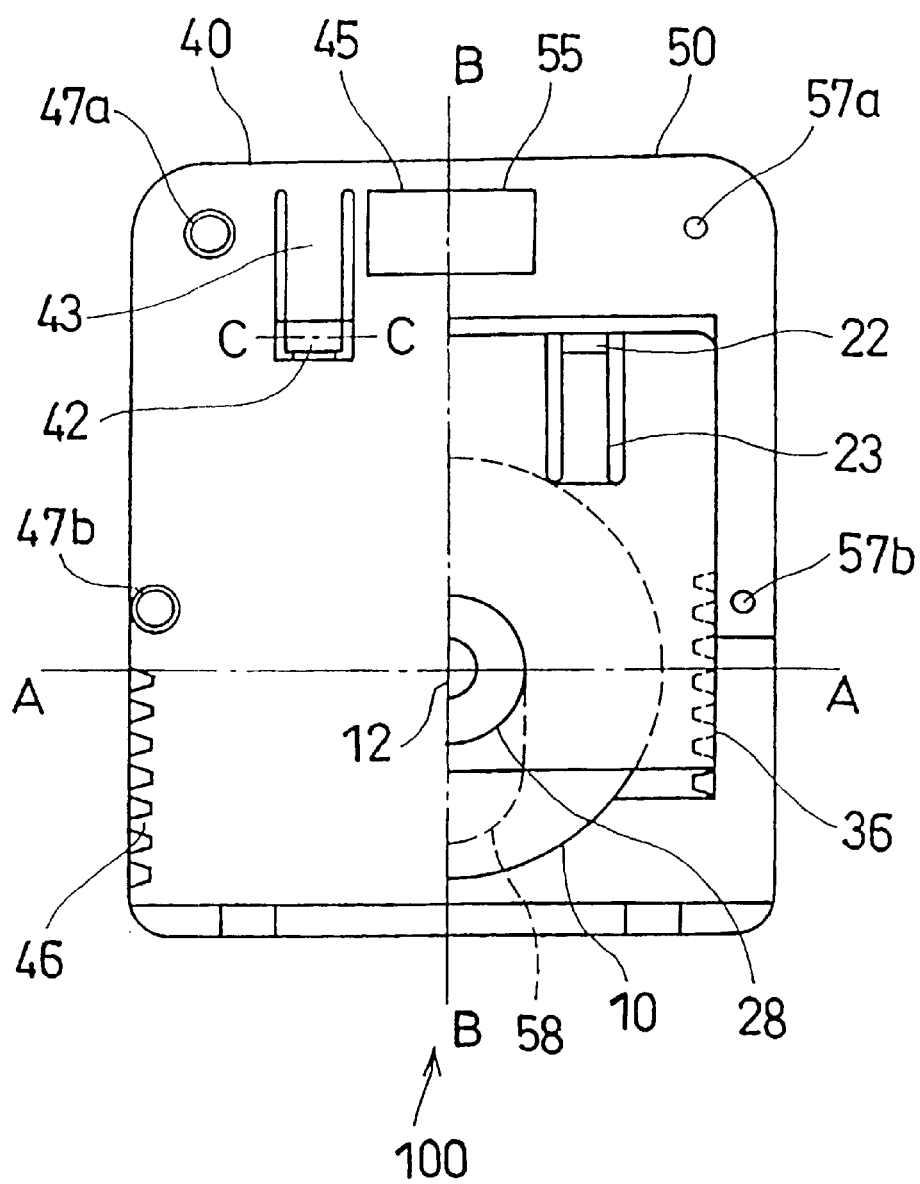
FIG. 4 is a front view of the cutter cassette in an inoperative state, according to the first embodiment, showing the cutter cassette divided left and right by the central axis B—B.
Figure 5:
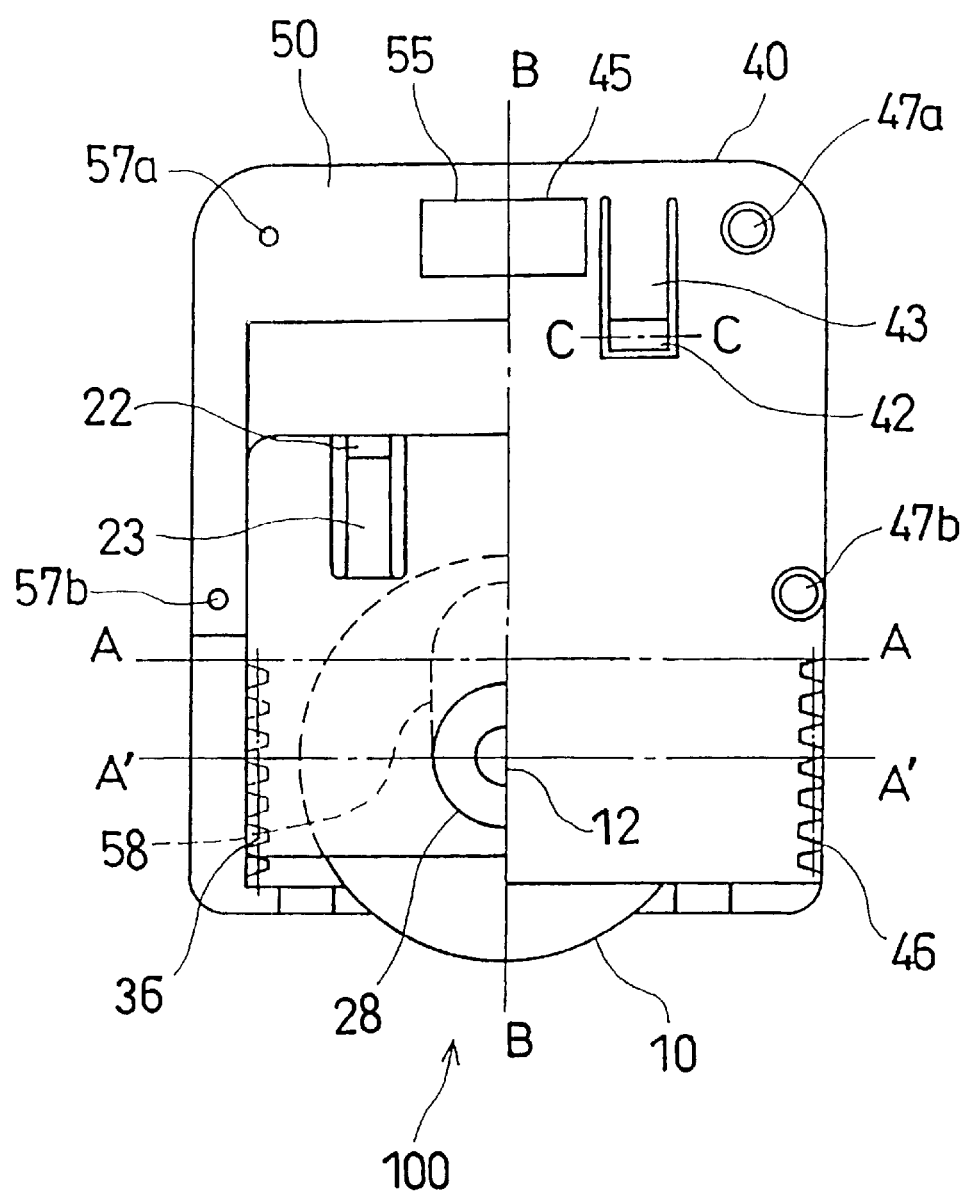
FIG. 5 is a front view of the cutter cassette in an operative, according to the first embodiment, showing the cutter cassette state divided left and right by the central axis B—B.

The invention includes a holding mechanism for holding the rotary blade 10 in case holder 70 in a completely inserted manner and a release mechanism for the holding mechanism, as shown in the front view of FIG. 4. However, some embodiments need not the release mechanism because an extending mechanism, which will be described later, acts as a release mechanism.

In the first embodiment according to the invention, the cutter cassette 100 includes three protrusions as a holding mechanism and a release mechanism for the rotary blade 10. Specifically, as shown in FIG. 1, the cutter case 60 has first protrusions 22 protruding outwardly from each end of arms 23 which are cut longitudinally at the front upper part thereof. A predetermined pressure is applied to the first protrusions 22, thereby warping them toward hollow portions 34 (refer to FIG. 2) on the inside of the cutter case 60. As shown in FIG. 6, the front case 40 of the case holder 70 includes second protrusions 41 protruding inwardly and third protrusions 42 protruding outwardly. The third protrusions 42 are also provided at each end of arms 43 which are cut longitudinally in the front case 40 (refer to FIG. 1). A predetermined pressure is applied to the third protrusions 42, thereby warping them toward the inside of the case holder 70. In the first embodiment of the invention, the first protrusions 22 and the second protrusions 41 constitute a holding mechanism and the first protrusions 22 and the third protrusions 42 constitute a release mechanism. Among the protrusions constituting the holding mechanism and the release mechanism, the first protrusion 22 is disposed right above the second protrusion 41 and the third protrusion 42 is disposed immediately in front of and adjacent to the first protrusion 22 in a state in which the rotary blade 10 is completely housed in the cutter case 60 (refer to FIG. 6).

The first protrusions 22 and the second protrusions 41 are engaged, so that the cutter case 60 is positioned in the case holder 70 so that the rotary blade 10 is held so as not to protrude outwardly (refer to FIG. 6). Also, the bottom of the first protrusion 22 and the upper surface of the second protrusion 41 may be subjected to surface treatment necessary to hold the rotary blade 10 by engaging with each other. For example, it is possible to engage them more securely by increasing friction resistance of the engaging surfaces or by finishing in necessary shape. Furthermore, the arms 23 and 43 which support the first protrusion 22 and the third protrusion 42, respectively, may be cut in the direction other than the longitudinal direction and also the outline may be curved. The size, position, and the number of the protrusions can be modified in accordance with the embodiment, and the invention is not bound by the modification.

Referring to FIGS. 4 to 9, the operation of extending the rotary blade 10 within the cutter cassette 100 in which the holding mechanism and the release mechanism constituted by the first to third protrusions are used will be described hereinbelow.

As shown in FIG. 6, the first protrusion 22 is supported by the second protrusion 41 from below. Since the first protrusion 22 is held as described above, the cutter case 60 is thereby positioned within the case holder 70. The layout thereof is shown in the front view of FIG. 4. Here, the center point of the rotary blade 10 within the case holder 70 is on the intersection of the lateral axis A—A and the longitudinal axis B—B. In this case, the third protrusion 42 is disposed adjacent to the first protrusion 22 in the case holder 70, the first protrusion 22 and the third protrusion 42 are arranged in series with the lateral axis C—C, as shown in FIG. 6. The state of the cutter cassette 100 at that time is defined as an inoperative state in the first embodiment of the invention.

Figure 7:
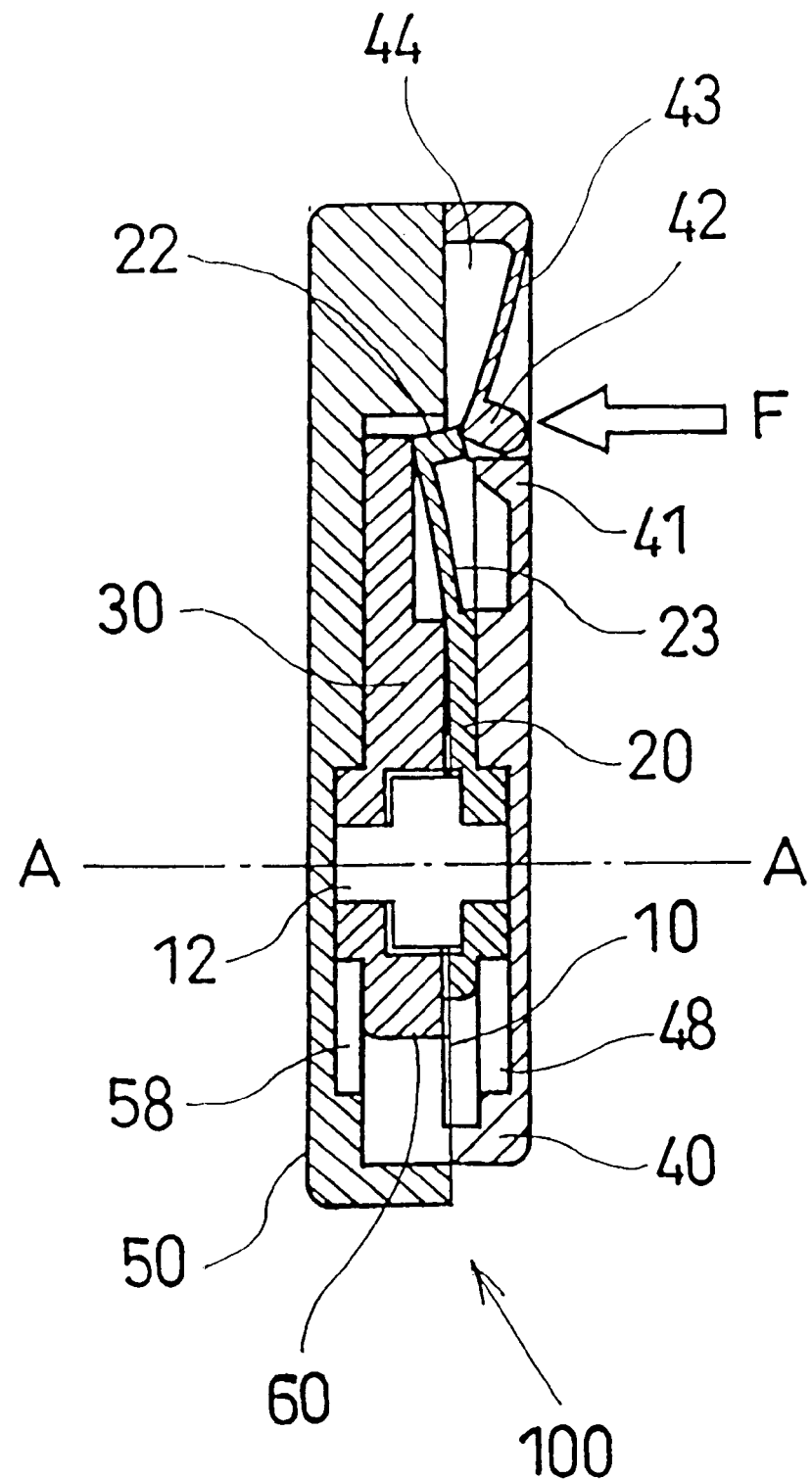
FIG. 7 is a side view of the cutter cassette according to the first embodiment, the cutter cassette being shifted from an inoperative state to an operative state.

As shown in FIG. 1, each of the first protrusions 22 and the third protrusions 42 have long arms 23 and 43 along the longitudinal direction of the cutter case 60 and the case holder 70, respectively. Such arms 23 and 43 are warped backwardly by the pressure from the front (refer to FIG. 7) and project and house the first protrusion 22 and the third protrusion 42 into the hollow portion 34 (refer to FIG. 2) and a hollow portion 44 (refer to FIG. 6), respectively. Accordingly, as shown in FIG. 7, when a predetermined force F is applied onto the third protrusion 42, the arm 43 warps backwardly, and the third protrusion 42 then pushes the first protrusion 22 supported by the second protrusion 41 backwardly. Accordingly, since the first protrusion 22 warps backwardly and projects into the hollow portion 34, the first protrusion 22 is disengaged from the second protrusion 41, so that the cutter case 60 loses its support and becomes movable downward in the case holder 70 (refer to FIG. 7).

Figure 8:
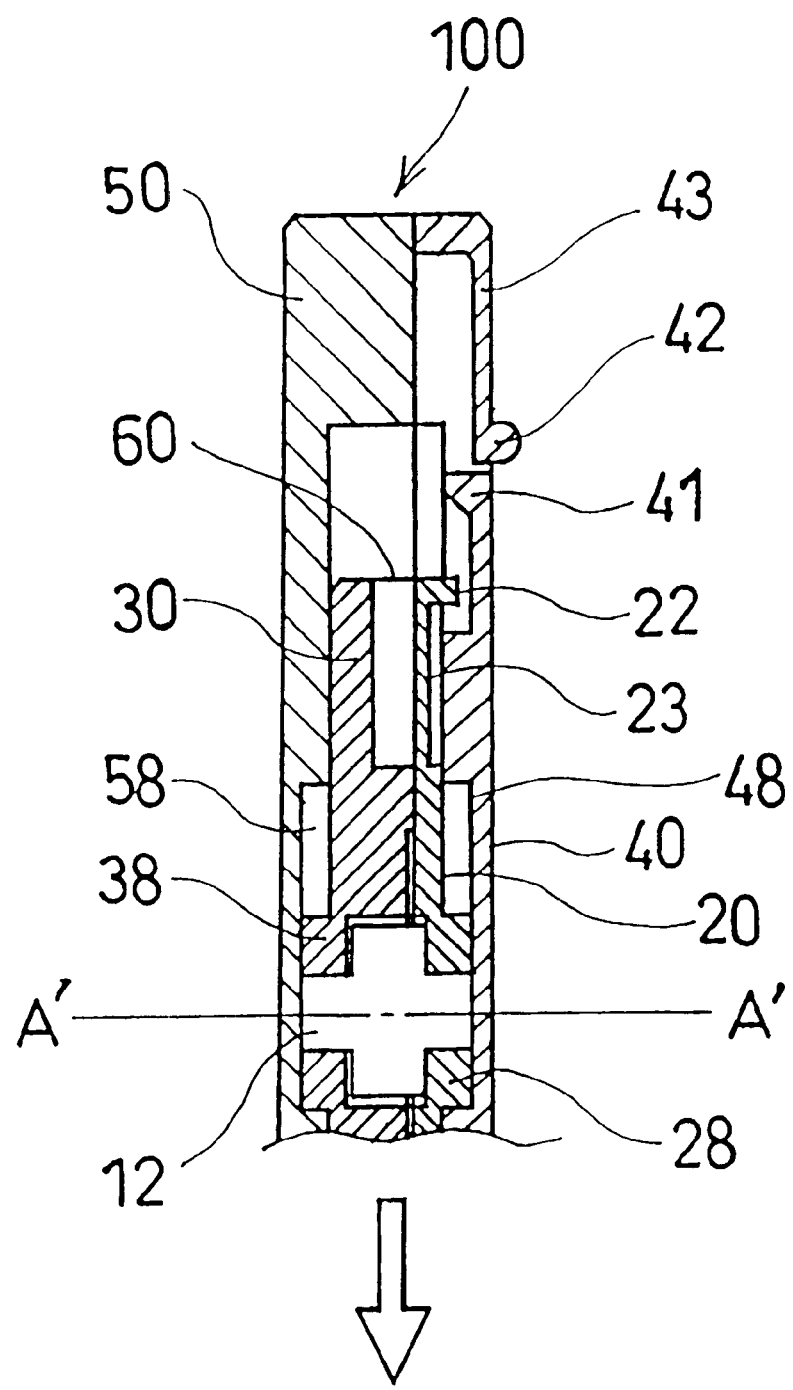
FIG. 8 is a side view of the cutter cassette shifted to an operative state, according to the first embodiment.

As shown in FIG. 8, the center point of the rotary blade 10 which lost the support can come down to the axis A'—A'. This position corresponds to a position at which the cylindrical protrusions 28 and 38 formed in the cutter case 60 come down to the lower end of the grooves 48 and 58 formed in the case holder 70. Therefore, only a part of the rotary blade 10, which is journaled in the cutter case 60, protrudes from the gap at the bottom of the case holder 70. The state of the cutter cassette 100 at that time is defined as an operative state in the first embodiment of the invention. In this case, only a part of the rotary blade 10 protrudes and the whole rotary blade 10 is not exposed. The relative position of the rotary blade 10 in the cutter cassette 100 at that time is shown in the front view of FIG. 5.

Figure 9:
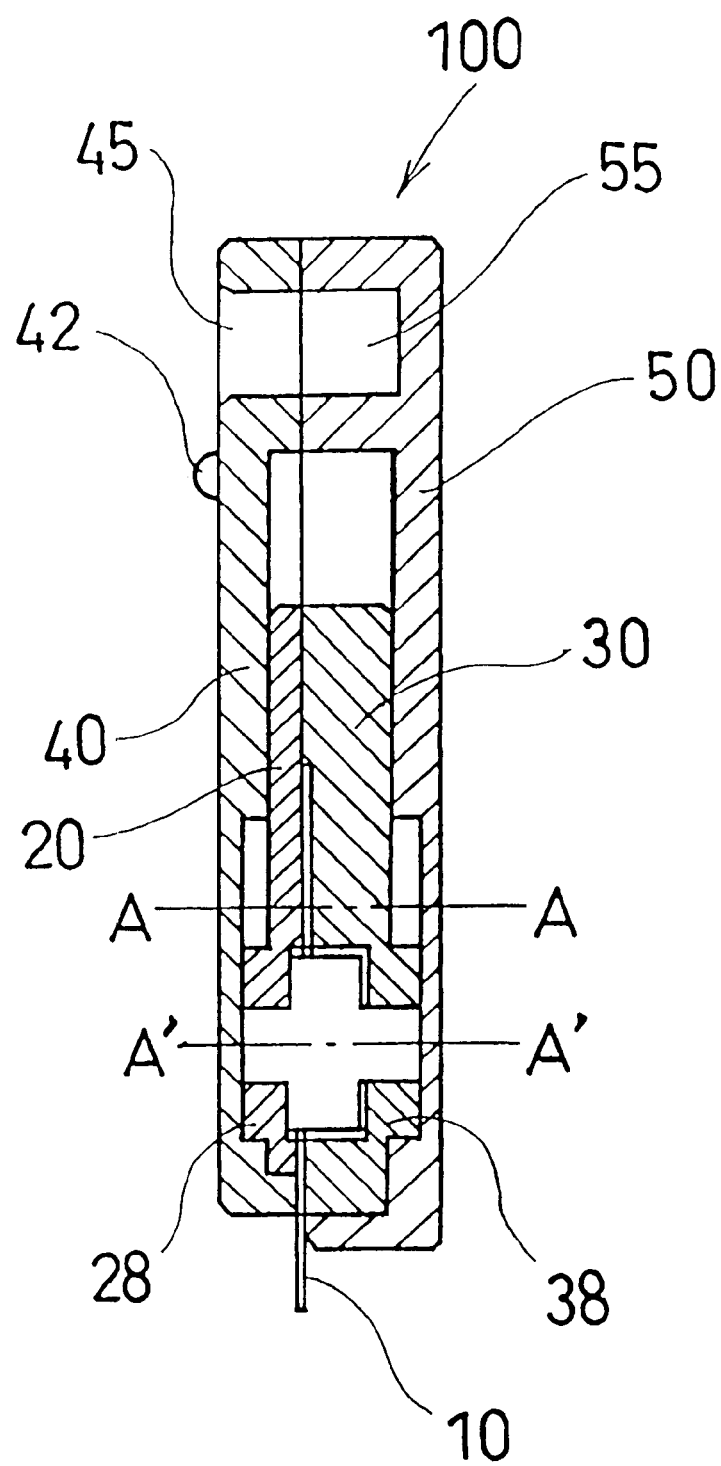
FIG. 9 is a side sectional view of the cutter cassette in an operative state, taken along the central axis B—B, according to the first embodiment.

As shown in FIGS. 6 and 7, the engagement of the front case 40 and the rear case 50 of the case holder 70 is offset at the protruding side of the rotary blade 10. In other words, the rear case 50 is slightly protruded downwardly with respect to the front case 40 so that the rotary blade 10 can rotate stably. Similarly, in the cutter case 60 which rotatably holds the rotary blade 10, the rear case 30 is slightly protruded downwardly with respect to the front case 20. Furthermore, as shown in FIGS. 1 and 9, hollow portions 45 and 55 are formed at the upper part of the case holder 70, and are used to hold the cutter cassette 100 in an operative state in position.

As described above, the invention includes the extending mechanism for protruding the rotary blade 10 from within the case holder 70. There are various configurations for implementing the extending mechanism.

First, an extending mechanism according to the first embodiment of the invention will be described. The extending mechanism shifts the cutter case 60 to an operative state in which it is protruded from the case holder 70. The extending mechanism is configured in order to ensure a swift sliding movement of the cutter case 60 in the longitudinal direction of the case holder 70. In the first embodiment of the invention, the extending mechanism is a rack mechanism, and engages with a gear mechanism of a cutting device, thereby increasing the amount of translatory motion of the inner cutter case 60 relative to that of the case holder 70, thereby protruding the rotary blade 10. Furthermore, with the extending mechanism, the rotary blade 10 is brought in and out only by a unidirectional pushing operation, and the balance between the positioning operations of an inoperative state and an operative state of the rotary blade 10 is maintained by synchronizing the left and the right rack pair. Other various mechanisms such as a multistage gear mechanism, a link mechanism, a lever mechanism, and a cam mechanism can be adopted as an extending mechanism according to the invention using, for example, an actuating rod.

In this case, while the rack pair formed as an extending mechanism on the sides of the cutter cassette 100 must also be combined with other suitable driving mechanism, it will be specifically described later.

Figure 13:
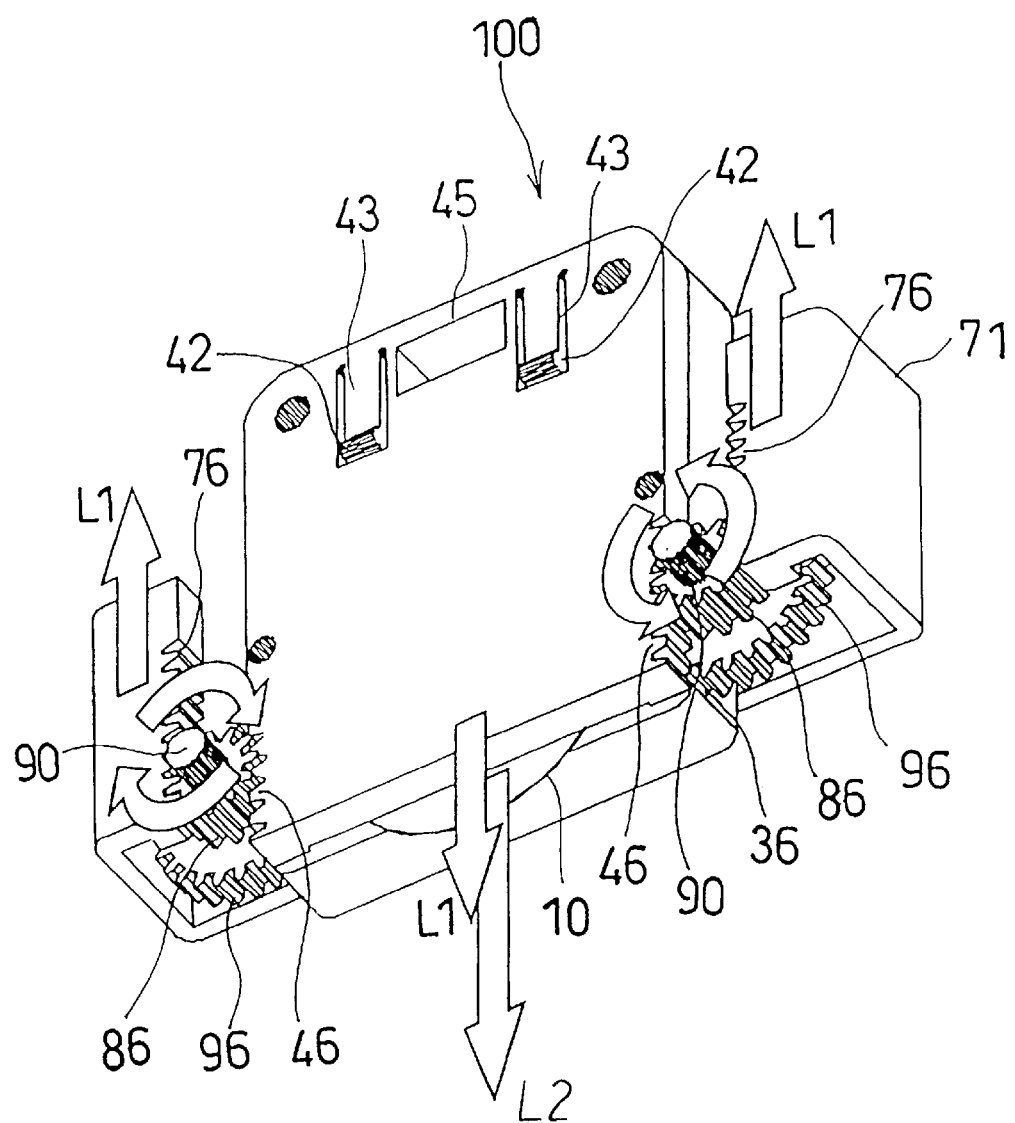
FIG. 13 is a perspective view of the cutter cassette according to the first embodiment, showing a state in which the cutter cassette is engaged with a driving mechanism including external racks and a gear mechanism.

As shown in FIG. 1, the case holder 70 includes a first rack pair 46 which is bilaterally symmetrical at both sides, and the cutter case 60 includes a second rack pair 36 which is bilaterally symmetrical at both sides, respectively, as an extending mechanism. Such rack pairs 46 and 36 are configured to engage with multistage gears in the cutting device, more preferably, with double gear pairs 86 and 96, and convert the translatory motion of the racks and the rotary motion of the double gears 86 and 96 to each other. Referring to FIG. 13, the rack pairs 46 and 36 are driven in straight lines, so that the gears 86 and 96 are rotated in the same direction. At this time, since the rack pairs 36 and 46 are moved in straight lines, the cutter case 60 which is integral with the second rack pair 36 and the case holder 70 which is integral with the first rack pair 46 are also moved rectilinearly. Here, the second rack pair 36 and the first rack pair 46 are synchronized in bilaterally symmetric relation to each other in order to smoothly slide the cutter case 60 toward the case holder 70 in the longitudinal direction. The rack pairs 36 and 46 and the gear pairs 86 and 96 preferably have the same module, the same pressure angle, and the same torsion angle. However, the torsion angle in the preferable embodiments is standardized to 0°. Also, other configurations such as surface finishing may also be the same. Furthermore, it is preferable to determine the standardized module or pressure angle in accordance with the industrial standards; however, it is not limited only to the Japanese standards.

Figure 10:
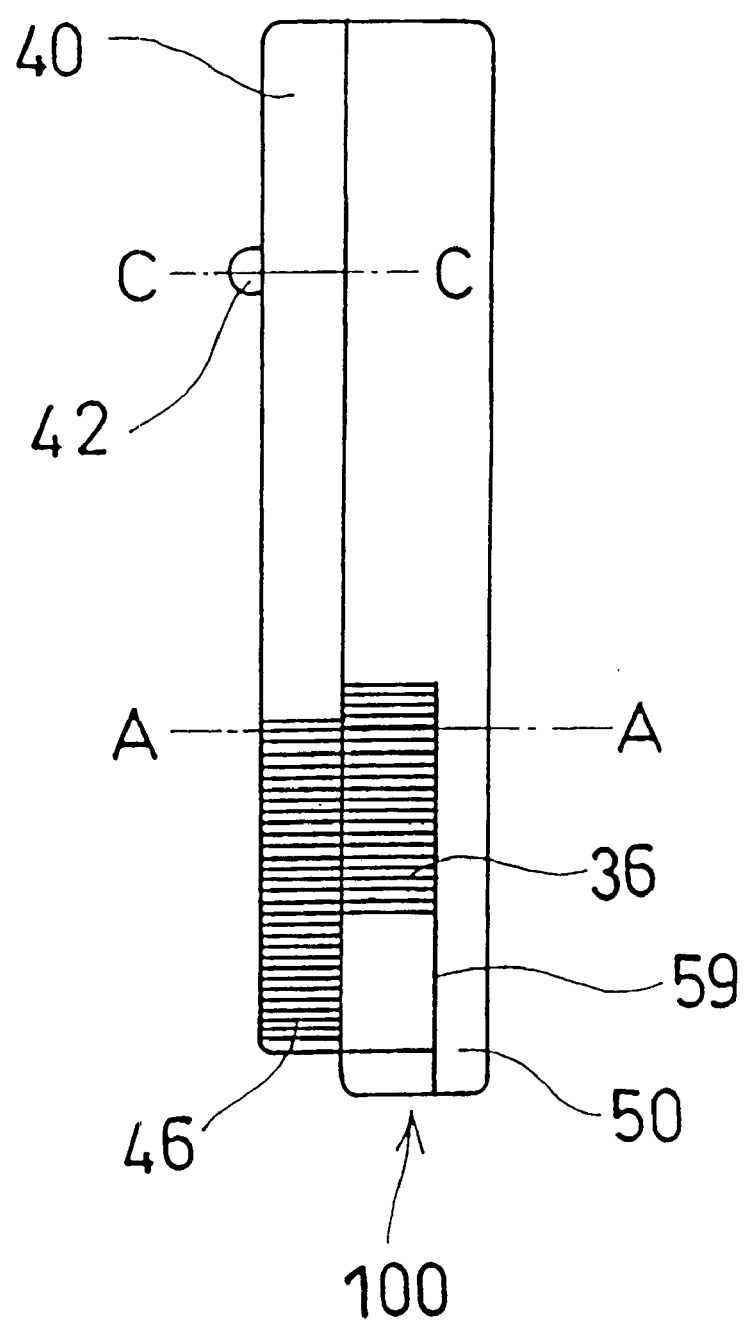
FIG. 10 is a side view of the cutter cassette in an inoperative state, according to the first embodiment.

As shown in FIG. 10, the rack pairs 36 and 46 provided at opposite sides of the cutter case 60 and the case holder 70, respectively, are arranged longitudinally in parallel with each other so that part thereof overlaps with each other. This is for the purpose of arranging the corresponding multistage gears, preferably, the double gears 86 and 96, for driving the rack pairs 36 and 46 on the same axis, respectively, on the left and right sides of the cutter case 60 and the case holder 70. Here, as shown in FIG. 1, the second rack pair 36 of the cutter case 60 is formed to the center of the rotary blade 10 as compared with the first rack pair 46 of the case holder 70. Preferably, the number of the tooth of gears 96 is larger than that of the gear 86 in the same module. Specifically, the ratio of the number of the tooth of the gear 86 and the gear 96 is substantially 2. In other words, by increasing the translation distance of the cutter case 60 substantially twice as much as the translation distance of the case holder 70, a part of the rotary blade 10 attached to the cutter case 60 is speedily protruded from the inside to the exterior. The ratio may not be limited to 2.0 in the strict sense but is selected from the range larger than 1. The rack pairs 36 and 46 are arranged in bilaterally symmetric relation to uniformly scatter the forces necessary for operation left and right.

Here, as shown in FIG. 13, the gear pair 86 which engages with the first rack pair 46 of the case holder 70 may be engaged with a third rack pair 76 of the cutting device using the cutter cassette 100 according to the invention. The third rack pair 76 is disposed on a holder 71 which surrounds the cutter cassette 100. The holder 71 preferably includes a port through which the cutter cassette 100 slides, as shown in FIG. 13. Assuming that the traveling distance of the first rack pair 46 mounted to the case holder 70 is L1, the third rack pair 76 travels the same distance L1 in the opposite direction. The traveling distance L2 of the second rack pair 36 for directly moving the rotary blade 10 is in the same direction as that of the case holder 70 and larger than L1, preferably, substantially twice as large as L1.

According to the first embodiment of the invention, by using the third rack pair 76 formed on the holder 71, the rotary blade 10 can be brought in and out only by a pushing operation from the above at any time. In other words, as shown in FIG. 13, when the cutter cassette 100 is pushed down from the above, the gear pairs 86 and 96 which engage with the rack pairs 46 and 36 are rotated in the same direction and also the downward-traveling distance of the cutter case 60 therein is increased as compared with that of the case holder 70, so that a part of the rotary blade 10 is protruded outwardly to become an operative state. In this case, the third rack pair 76 on the holder 71, which engages with the gear pair 86, is moved upwardly in a direction opposite from the cutter cassette 100. A shaft 90 is fixed in position.

By pushing the holder 71 including the third rack pair 76 downward from the above, the operative state of the cutter cassette 100 can be returned to an inoperative state. In other words, the gear pair 86 is rotated backwardly in correspondence to the downward movement of the third rack pair 76, and the corresponding shaft 90 is rotated backwardly, so that the gear pair 96 is also rotated backwardly to thereby move the rack pairs 46 and 36 which engage therewith, respectively, upwards and to return the cutter cassette 100 to an inoperative state while housing the rotary blade 10 therein. Also when the rotary blade 10 is housed, the second rack pair 36 travels a distance longer than that of the first rack pair 46 in the same way as when it is protruded. In this manner, only by the pushing operation from the above, the inoperative state and the operative state of the cutter cassette 100 can be freely selected at any time.

Although the extending operation of the cutting blade 10 using the two rack pairs 36 and 46 is described in the above embodiment, the cutting blade 10 may be extended by using only one rack pair. As shown in FIG. 3, the rack pair 36 is disposed only at the cutter case 60, and the case holder 70 is provided with only openings 59. In other words, after the cutter cassette 100 has been mounted on the cutting device, the rotary blade 10 is protruded by using an external gear mechanism. In this case, the extending operation of the rotary blade 10 and the pushing operation of the cutter cassette 100 are not always synchronized with each other.

Figure 11:
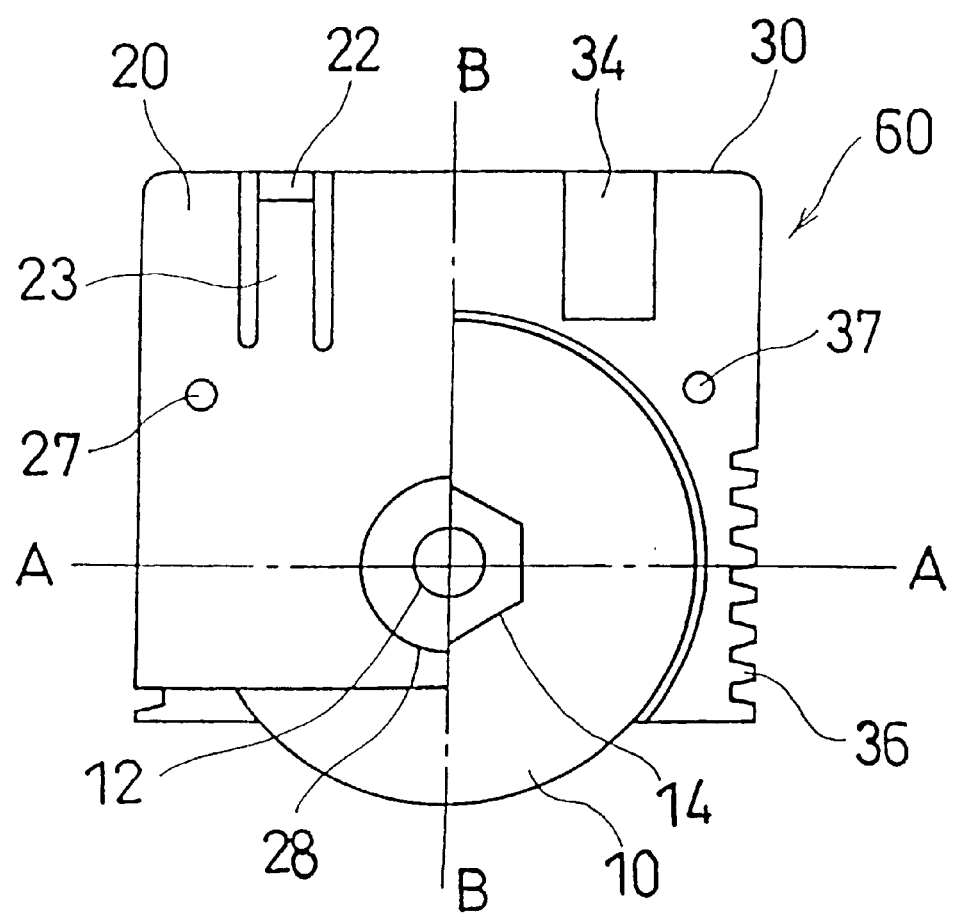
FIG. 11 is a front view of the cutter cassette according to the first embodiment, showing the cutter cassette divided left and right by the central axis B—B.

The method for holding the rotary blade 10 in the cutter case 60 will be described hereinbelow. As shown in FIG. 11, in the embodiment using the rotary blade 10, the rotary blade 10 is supported by the shaft 12 coaxial with the central axis thereof using a hexagonal bearing 14. The rotary blade 10 has a hexagonal supporting hole 13 (refer to FIG. 2) formed at the center thereof and is engaged with and supported by the bearing 14. The shaft 12 is formed in a cylindrical shape at opposite ends thereof and is smoothly and freely pivoted in the front cylindrical protrusion 28 and the rear cylindrical protrusion 38 (refer to FIG. 6). The shaft 12 is formed in a hexagonal shape at a position to secure the rotary blade 10, so that it is freely pivoted along with the rotary blade 10 via the supporting hole 13 (refer to FIG. 2). When the cutter blade 10 is not the rotary blade 10, but a knife or the like for cutting without rotating (refer to FIG. 3), the shaft 12 may be omitted.

Figure 12:
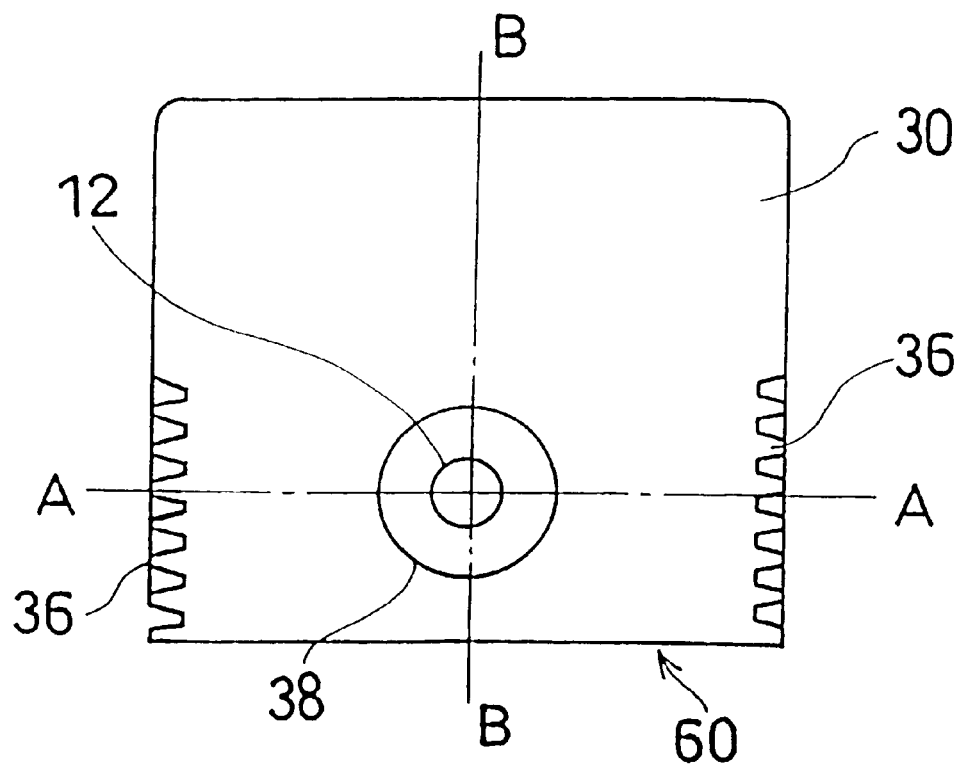
FIG. 12 is a rear elevation of a cutter case according to the first embodiment.

The cutter case 60 is constituted by the two mating cases 20 and 30 fastened by screws while sandwiching the rotary blade 10 from the back and the front. The screwed portions are indicated by the reference numerals 27 and 37 (refer to FIG. 11). The rear elevation of the cutter case 60 is shown in FIG. 12 and the front and the rear cylindrical protrusion 28 and 38 are shown with the cross line of the plane A—A and the plane B—B as the center. However, the shape of the cylindrical protrusions 28 and 38 may not be strictly limited to be cylindrical.

The case holder 70 has the openings 59 (refer to FIGS. 1 and 10) at portions of opposite sides of the case holder 70 in order to engage the second rack pair 36 at opposite sides of the cutter case 60 with the gear pair 96 of the cutting device, so that the rack pairs 36 and 46 can directly engage with the gear pairs 96 and 98 of the cutting device. While the invention is office equipment, the two rack pairs constituting the cutter cassette are exposed to the exterior, thereby facilitating manual sliding work and the like and improving maintaining ability. The rack pairs 36 and 46 can be separately and removably attached to the cutter cassette 100 according to the invention.

As described above, in the first embodiment, a structural example including three protrusions as a holding mechanism and a release mechanism is shown. However, there are also alternative structural examples using a spring, a magnet, implanted hair, or the like as a holding mechanism. Such configurations do not particularly need a release mechanism. In the first embodiment, a structural example including a rack and a gear as an extending mechanism is shown. However, there are alternative various extending mechanisms. Specifically, one example is a mechanism using at least one external mechanism among a link mechanism, a lever mechanism, and a cam mechanism using an actuating rod.

All modifications will not be described in order to avoid overlaps of description, but alternative embodiments according to the invention will be described within the necessary and sufficient scope. The following modifications are summarized as compared with the first embodiment as follows:

a) As a second embodiment according to the invention, an embodiment will be described in which only a holding mechanism and a release mechanism are modified to a structure using an elastic body (refer to FIGS. 14 to 17).

b) As a third embodiment according to the invention, an embodiment will be described in which a holding mechanism and a release mechanism are modified to a structure using an elastic body and an actuating rod is used as an extending mechanism (refer to FIGS. 18 to 21).

c) As a fourth embodiment according to the invention, an embodiment will be described in which only an extending mechanism is modified to a structure using an actuating rod provided at the exterior of the cutter cassette 100 (refer to FIGS. 22 to 24).

d) As a fifth embodiment according to the invention, an embodiment will be described in which only an extending mechanism is modified to a structure using an actuating rod provided at the interior of the cutter cassette 100 (refer to FIGS. 25 to 27).

Alternatively, a protrusion may be provided at an outside surface of the cutter cassette 100 in place of the actuating rod and is engaged with a cam groove formed in an external mechanism, thereby extending the cutting blade 10 of the cutter cassette 100 according to the invention. Furthermore, it is also possible to extend the cutting blade 10 manually without the external mechanism.

Other embodiments according to the invention which are not described here may be used similarly within the scope of the claims of the invention.

The cutter cassette 100 according to the second embodiment of the invention will be described hereinbelow with reference to FIGS. 14 to 17.

Figure 14:
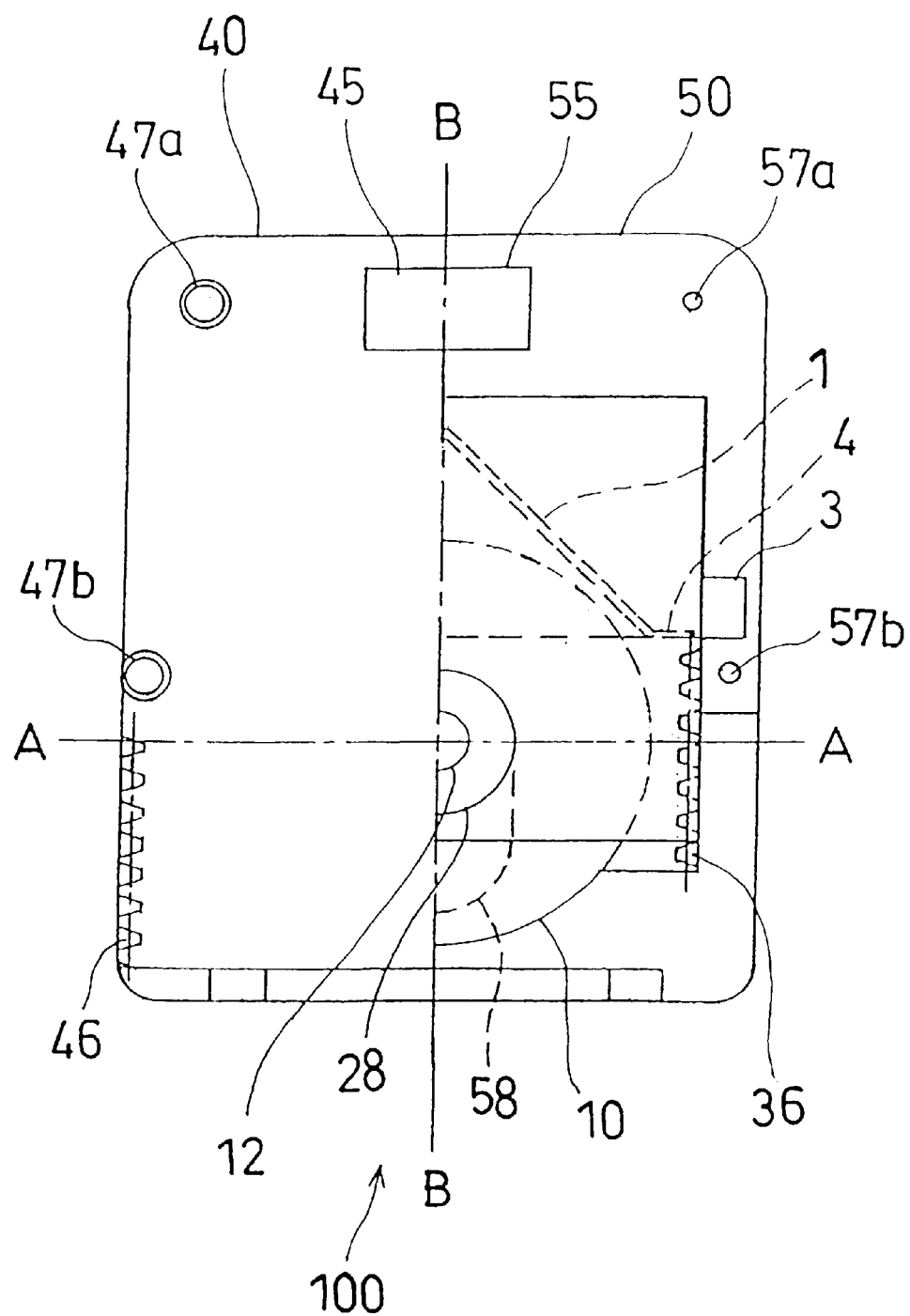
FIG. 14 is a front view of a cutter cassette in an inoperative state, according to a second embodiment, showing the cutter cassette divided left and right by the central axis B—B.

As shown in a front view of FIG. 14, in the second embodiment, the cutter cassette 100 is similarly constituted by a cutter case, a case holder, a holding mechanism, a release mechanism, and an extending mechanism. However, in the second embodiment, portions corresponding to the holding mechanism and the release mechanism are modified as compared with the first embodiment. Specifically, in the second embodiment, the three protrusions 22, 41, and 42 according to the first embodiment are modified to a single elastic body 1 (refer to FIG. 14). Accordingly, the configuration is modified to a more simplified shape. Specifically, the elastic body 1 is a spring having predetermined elasticity.

The modified holding mechanism and release mechanism will be described hereinbelow.

As shown in FIG. 14, the cutter cassette 100 has the spring 1 mounted therein as a holding mechanism and a release mechanism. The spring 1 is disposed in a substantially inverted V shape, one end (refer to numeral 2 in FIG. 16) of which is attached to the cutter case 60 side and the other end (refer to numeral 4 in FIG. 14) is attached to the case holder 70 side, thereby applying elasticity between them. The elasticity of the spring normally causes the cutter case 60 to be pulled into the case holder 70. The state of the cutter cassette 100 at that time is defined as an inoperative state in the second embodiment. The front view of FIG. 14 corresponds to a side view of FIG. 16. In FIG. 14 which shows an inoperative state of the cutter cassette 100 in the second embodiment, the axis A—A corresponds to the axis A—A in FIG. 4 which shows an inoperative state of the cutter cassette 100 in the first embodiment.

When the cutting blade 10 is held in the case holder 70 in a completely inserted state, an end 4 of the spring 1 is disposed in the horizontal direction parallel to the axis A—A, and a hollow 3 is formed in the case holder 70 and adjacent to the end 4 of the spring 1.

Figure 15:
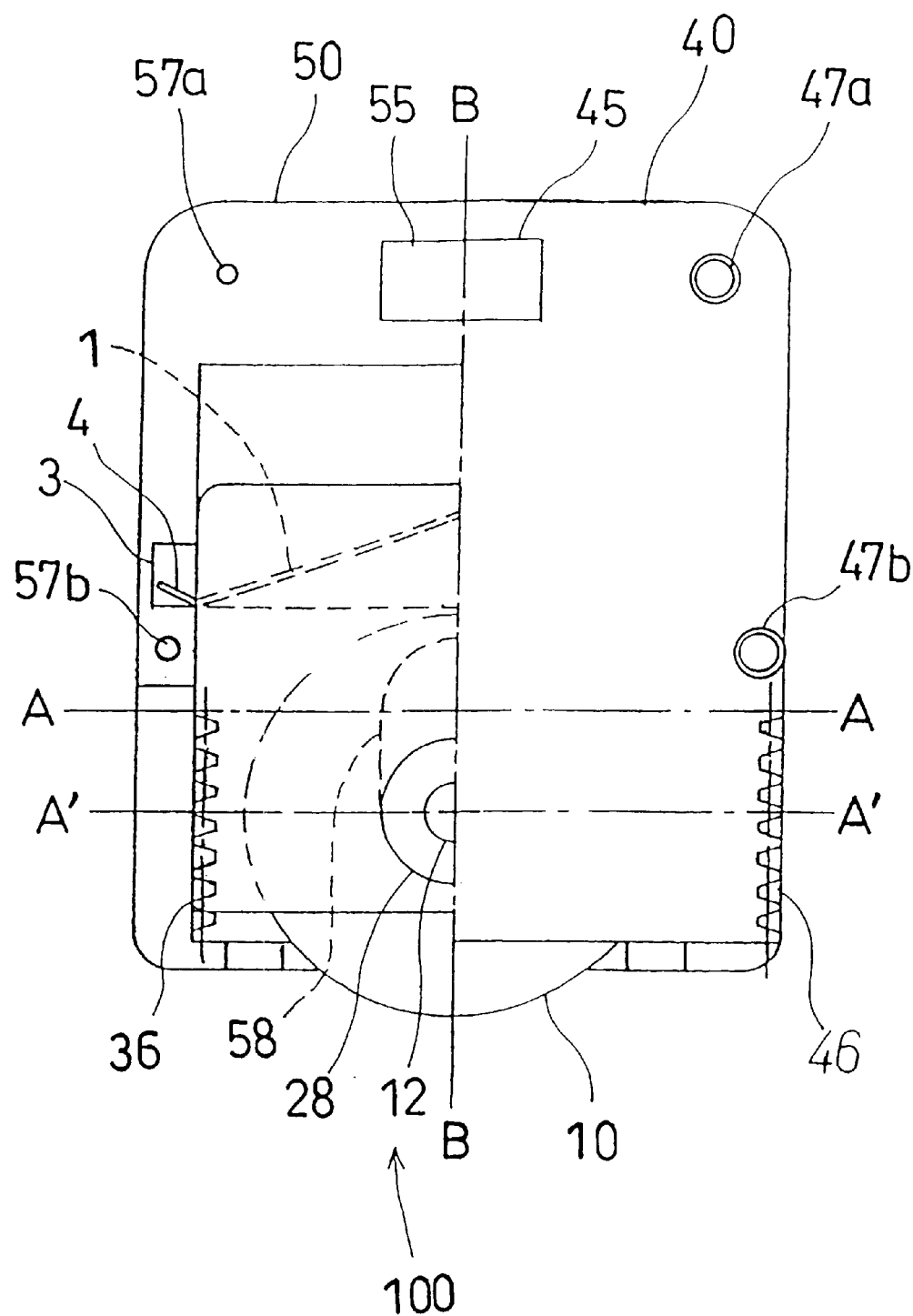
FIG. 15 is a front view of the cutter cassette in an operative state, according to the second embodiment, showing the cutter cassette divided left and right by the central axis B—B.
Figure 16:
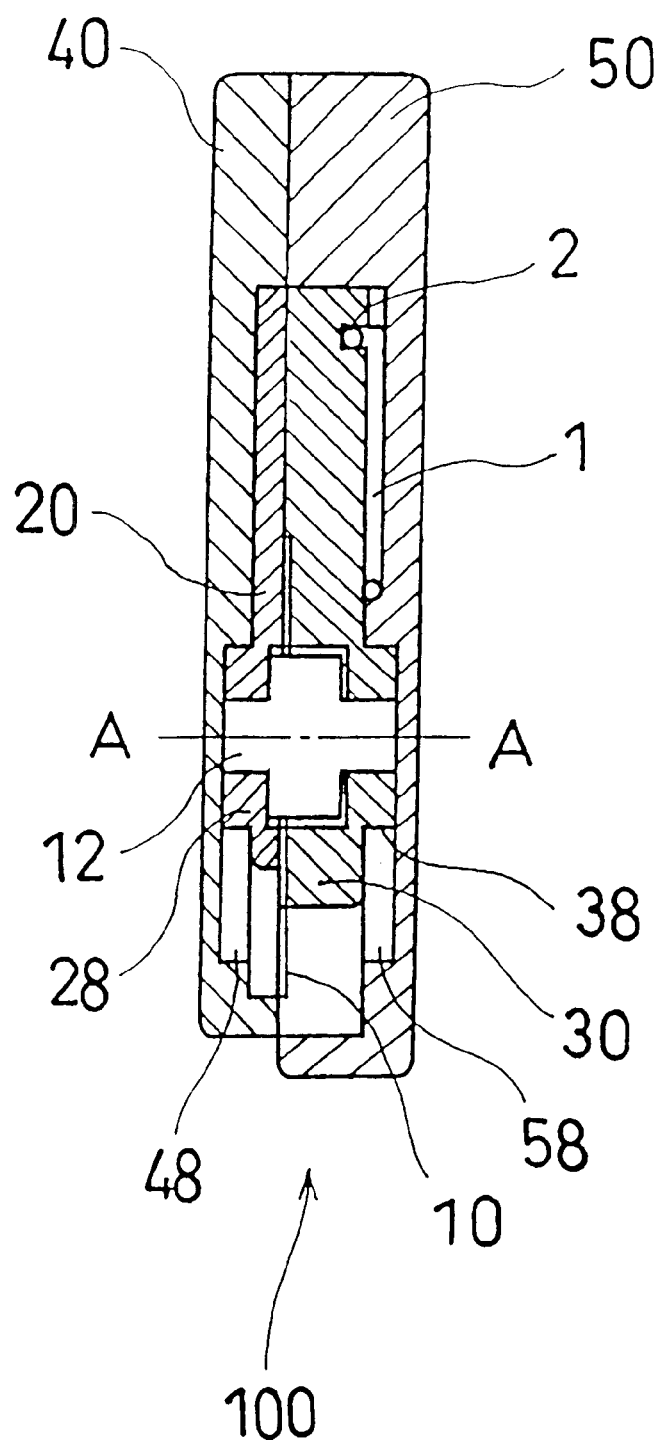
FIG. 16 is a sectional view of the cutter cassette in an inoperative state, according to the second embodiment.

As shown in FIG. 15, the second embodiment of the invention also includes a function of extending a portion of the rotary blade 10 outwardly from the case holder 70 in a manner similar to the above-described first embodiment. However, a description of a method for extending the rotary blade 10 using the extending mechanism constituted by the racks and the gears will be omitted in order to avoid overlaps of description.

The spring 1 has elasticity sufficient to hold the cutter case 60 in the case holder 70 in a completely inserted state, as described above. When a force larger than designated elasticity provided for the spring 1 is applied to the cutter case 60 from the exterior, as shown in FIG. 15, the cutter case 60 slides downward in the case holder 70 to extend a portion of the rotary blade 10 outwardly from the case holder 70. At this time, the end portion 2 of the spring 1, which is secured to the cutter case 60 side, comes down, so that the spring 1 is compressed vertically in accordance with the movement of the cutter case 60. At this time, the end 4 of the spring 1 escapes into the hollow 3 of the adjacent case holder 70. The end 4 is inclined upwardly from a horizontal position parallel to the initial axis A—A. The spring 1 applies designated elasticity between the cutter case 60 and the case holder 70 to bring the cutter case 60 into the case holder 70 again. The state of the cutter cassette 100 at that time is defined as an operative state in the second embodiment.

Figure 17:
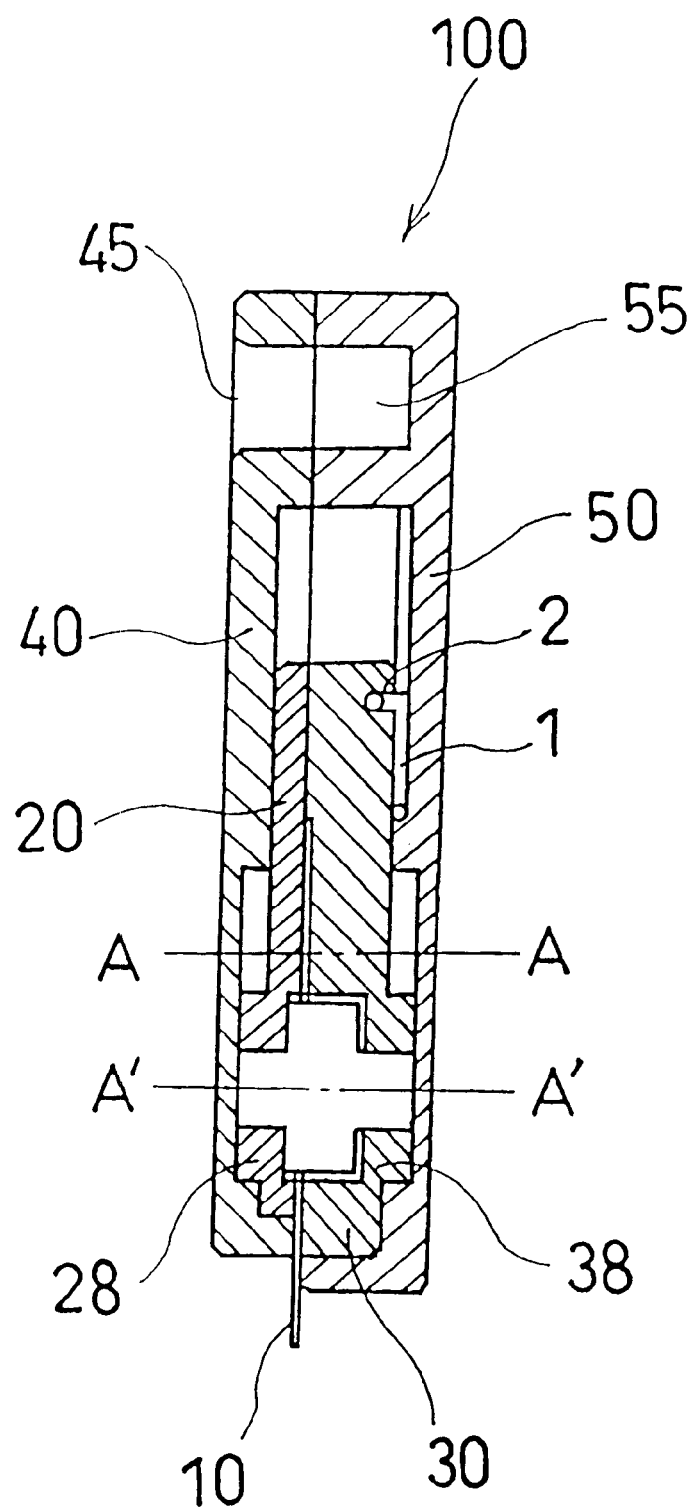
FIG. 17 is a sectional view of the cutter cassette in an operative state, according to the second embodiment.

Apparently, a front view of FIG. 15 corresponds to a side view of FIG. 17. The axis A'—A' in FIG. 15, which shows an operative state of the cutter cassette 100 in the second embodiment, corresponds to the axis A'—A' in FIG. 5, which shows an operative state of the cutter cassette 100 in the first embodiment.

Accordingly, in the second embodiment, a holding mechanism of the cutter cassette 100 is constituted by using elasticity of the spring 1. Similarly, a release mechanism for releasing the holding mechanism is constituted by using the elasticity of the spring 1.

It is apparent that the position, number, and shape of the spring 1 in the cutter cassette 100 can be modified. Specifically, it is sufficient for the spring 1 to satisfy the holding mechanism and the release mechanism.

Magnets, implanted hair, or the like may be used as the holding mechanism in place of the plate spring. Specifically, magnets or implanted hair are provided to face each other at the outer surface of the cutter case 60 and the inner surface of the case holder 70 to hold the cutting blade 10 in the cutter cassette 100 in an inoperative state with the force of attraction or friction so that it does not protrude therefrom. When the plate spring, the magnets, the implanted hair, or the like is used as a holding mechanism, a release mechanism for the holding mechanism is used in combination with an extending mechanism using an external driving mechanism.

Next, a third embodiment according to the invention will be described with reference to FIGS. 18 to 21.

In this embodiment, the cutter case 60 is pushed out from the case holder 70 by applying an external force from the above, thereby shifting the cutting blade 10 to an operative state. Accordingly, the cutter case 60 and the case holder 70 do not include racks and are constituted in a simpler way. However, the external force is transmitted via the actuating rod 9.

Specifically, the case holder 70 has an opening 18 (refer to FIG. 19) formed therein, through which an external force is directly applied using the actuating rod 9 to the cutter case 60 in the case holder 70. The cutter case 60 has a protrusion 19 for receiving an external force from the exterior. The protrusion 19 slides along the opening 18 in the case holder 70, thereby sliding the cutter case 60 integrated with the protrusion 19 in the same direction in the case holder 70. Preferably, in an inoperative state of the cutter cassette 100 in which the center of the rotary blade 10 is placed on the axis A—A, the protrusion 19 and the opening 18 are arranged in parallel with each other, thereby allowing the external force to be promptly applied onto the protrusion 19 via the actuating rod 9 (refer to FIGS. 18 and 20).

Figure 18:
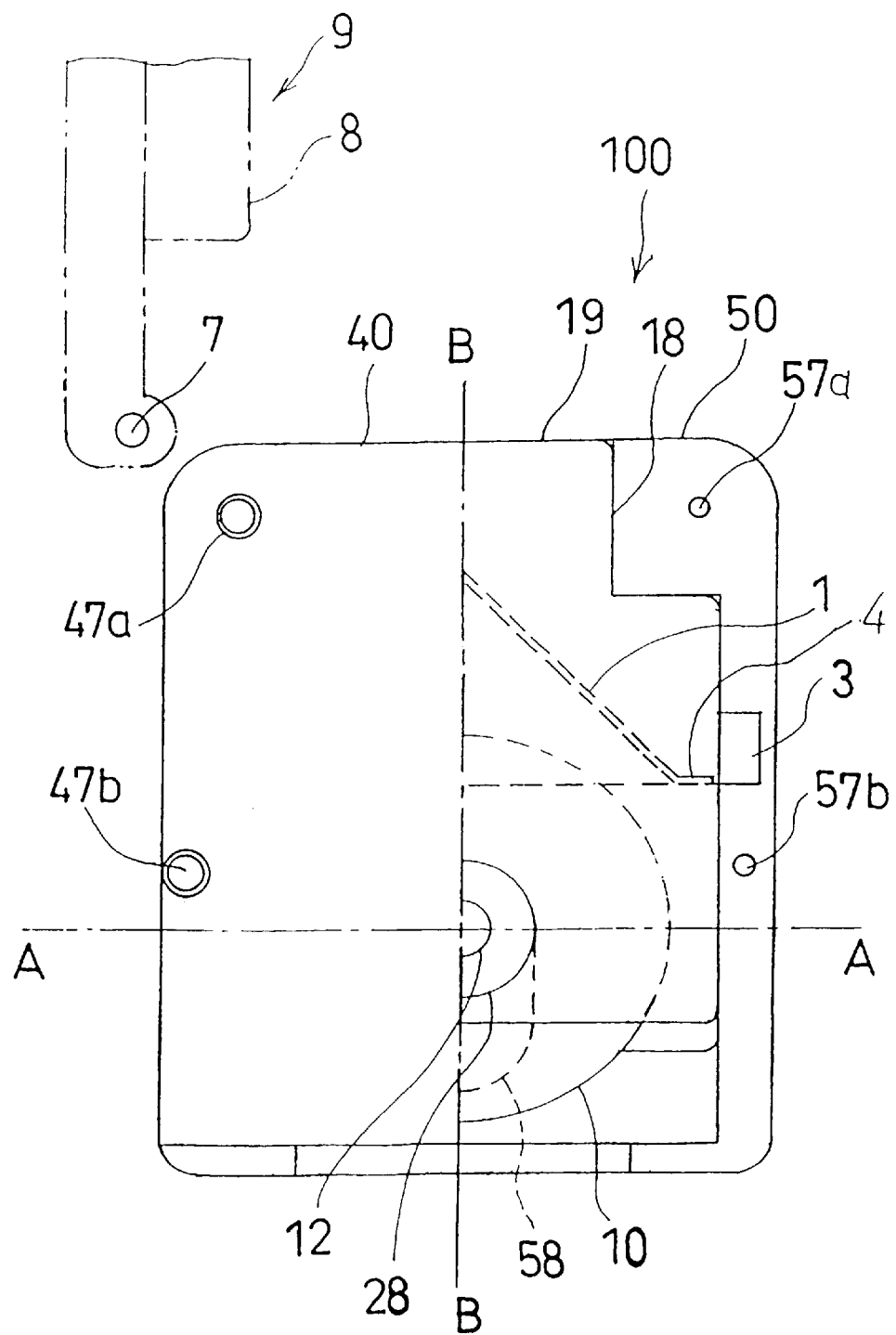
FIG. 18 is a front view of a cutter cassette in an inoperative state, according to a third embodiment, showing the cutter cassette left and right divided by the central axis B—B.
Figure 19:
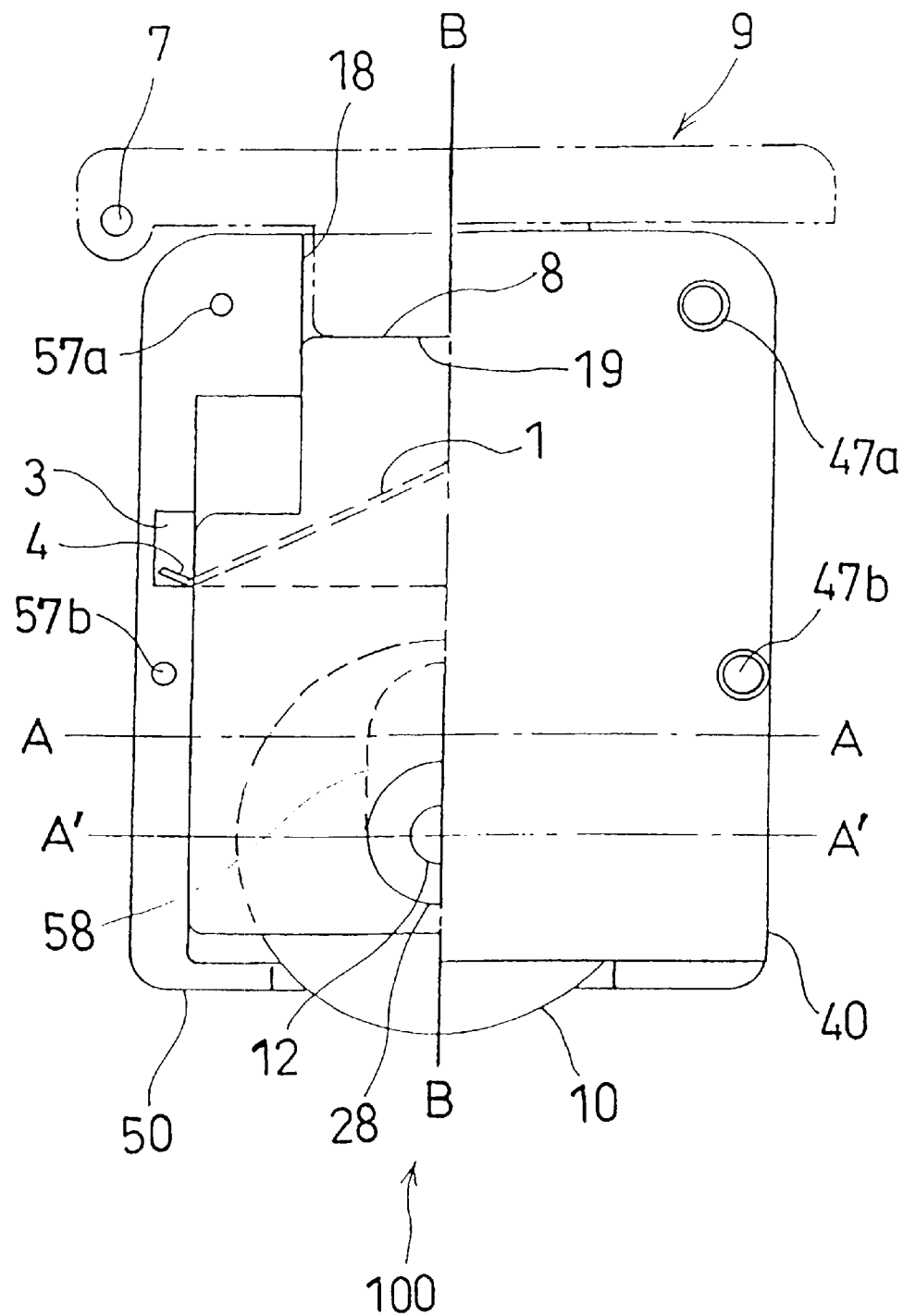
FIG. 19 is a front view of the cutter cassette in an operative state, according to the third embodiment, showing the cutter cassette divided left and right by the central axis B—B.
Figure 20:
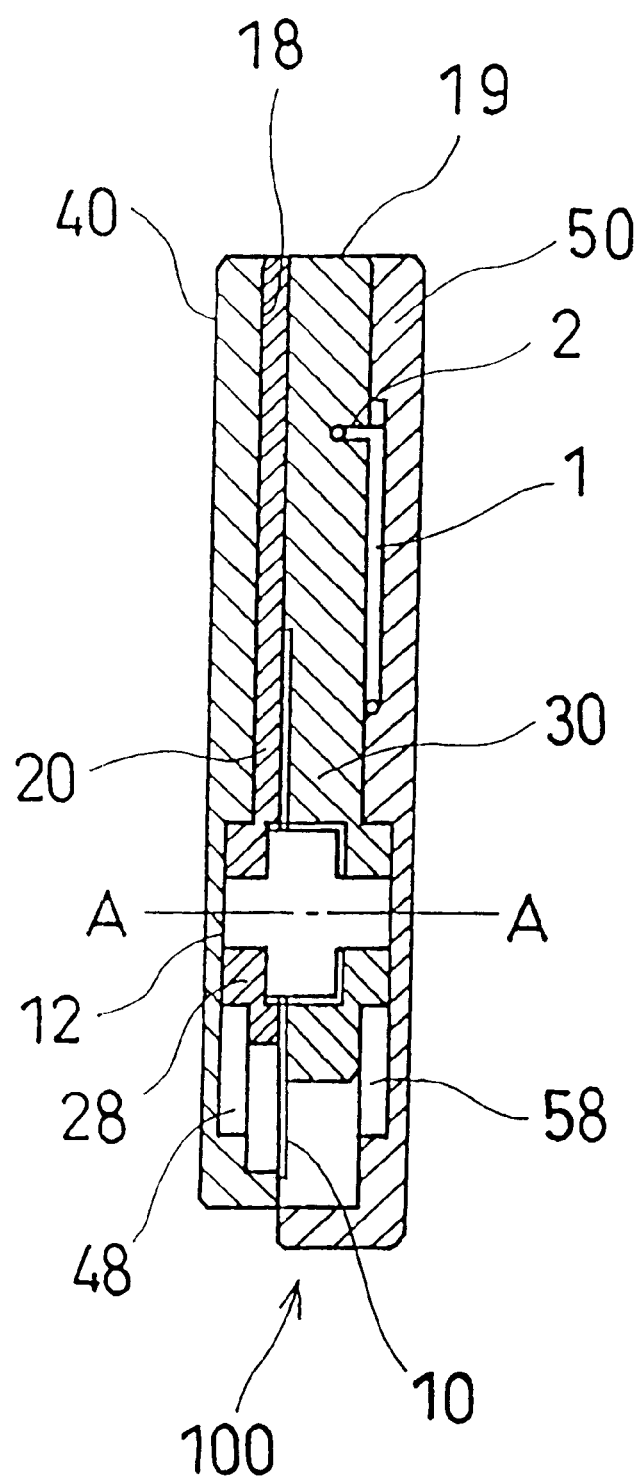
FIG. 20 is a sectional view of the cutter cassette in an inoperative state, according to the third embodiment.
Figure 21:
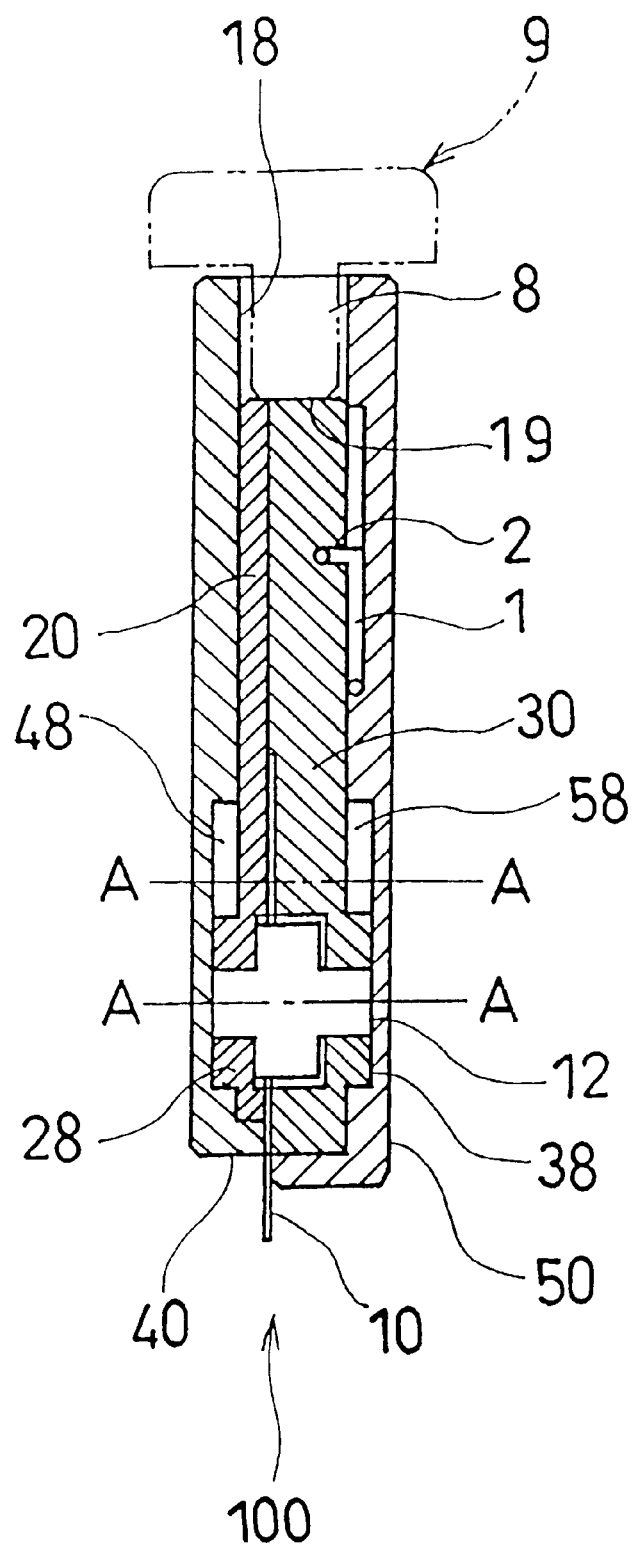
FIG. 21 is a sectional view of the cutter cassette in an operative state, according to the third embodiment.

There are various configurations for exerting an external force using the actuating rod 9. In the third embodiment, specifically, the actuating rod 9 is pivotal about a portion 7, and a protrusion 8 is provided, as shown in FIG. 18. The protrusions 8 and 19 are brought into contact with each other by pivoting the actuating rod 9, and the protrusion 19 on the cutter case 60 is pushed into the case holder 70 using the protrusion 8. Accordingly, the cutter case 60 is moved downward in the case holder 70, thereby shifting the rotary blade 10 to an operative state (refer to FIGS. 19 and 21).

The actuating rod 9 may not be pivoted in the vicinity of the portion 7 in the strict sense. Furthermore, the actuating rod 9 may not be pivoted but may be slid vertically in parallel with the traveling direction of the cutter case 60 to bring the protrusions 8 and 19 into contact with each other, thereby pushing the protrusion 19 into the case holder 70 using the protrusion 8.

In order to terminate the extending operation, the actuating rod 9 is returned to an initial state, and the protrusion 8 and the protrusion 19 are thereby disengaged from each other. In the third embodiment, the spring 1 provided in the cutter cassette 100 is returned to an initial state using designated elasticity to thereby terminate the extending operation. The principle of the terminating operation of the operative state is different from that of the holding mechanism and the release mechanism according to the first embodiment.

A fourth embodiment of the invention will be described with reference to FIGS. 22 to 24.

As described above, this embodiment adopts the same mechanism as that of the first embodiment as a holding mechanism and a release mechanism. Therefore, a description of the holding mechanism and the release mechanism will be omitted here. However, an extending mechanism is modified in this embodiment. Specifically, actuating rods 105 are disposed adjacent to each other on opposite outer sides of the cutter cassette 100 as an extending mechanism. Only the modified extending mechanism will be described hereinbelow in order to avoid overlaps of description.

Figure 22:
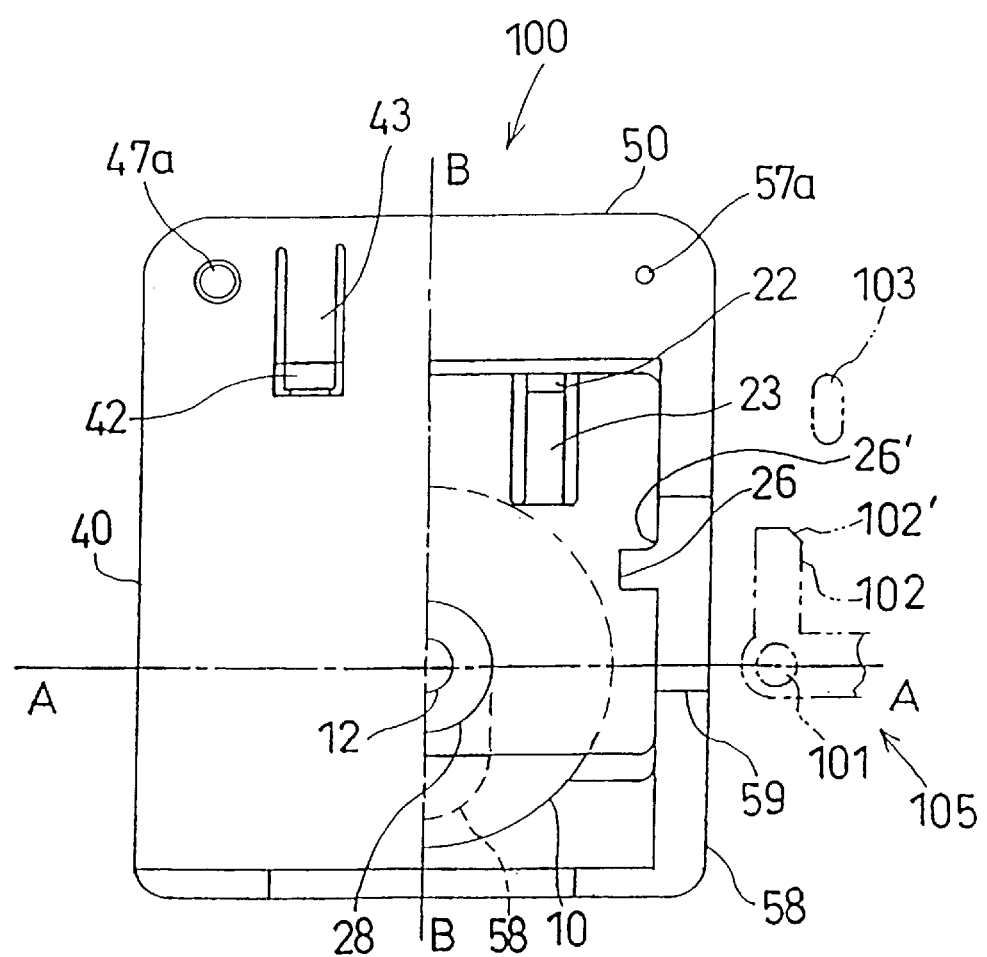
FIG. 22 is a front view of a cutter cassette in an inoperative state, according to a fourth embodiment, showing the cutter cassette left and right divided by the central axis B—B.

As shown in FIG. 22, in this embodiment, the actuating rods 105 are preferably disposed in bilaterally symmetric relation to each other on opposite sides of the cutter cassette 100. Specifically, each of the actuating rods 105 is curved perpendicularly about a portion 101 and pivotal about the portion 101. The actuating rod 105 has an actuating portion 102 for extension at an end thereof and an operating portion 104 at the other end thereof. In operation, the actuating rod 105 is pivoted about the portion 101, so that the actuating portion 102 is engaged with the cutter case 60 in the case holder 70.

Therefore, as shown in FIG. 22, the case holder 70 has the openings 59 formed on opposite sides thereof so that the cutter case 60 in the case holder 70 faces the exterior directly. Since the cutter case 60 also has bilaterally symmetrical grooves 26 for engaging with the actuating portions 102 at positions to face the exterior from the opposite openings 59. A front view of FIG. 22 corresponds to a plan view of FIG. 23.

Figure 23:
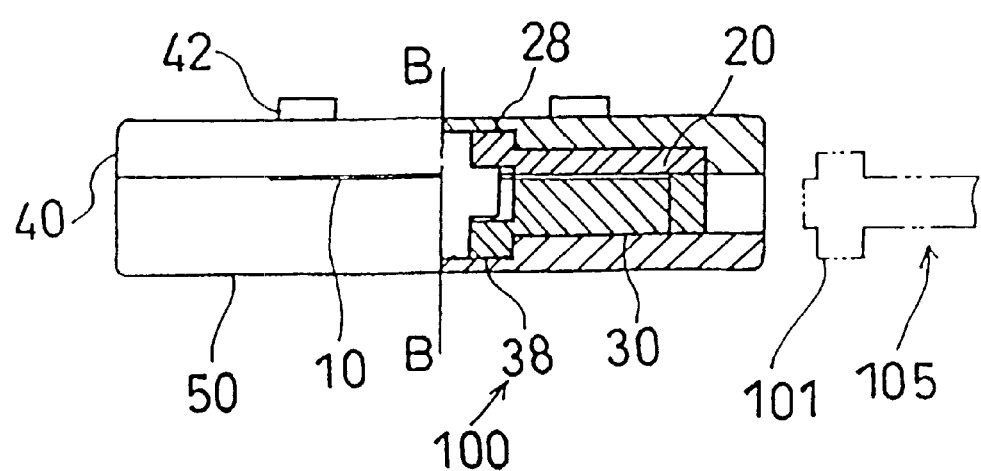
FIG. 23 is a plan view of the cutter cassette in an inoperative state, according to the fourth embodiment, showing the cutter cassette divided left and right by the central axis B—B.

In order to smoothly engage the actuating portion 102 with the groove 26, the actuating portion 102 may be chamfered at an end 102' and the groove 26 may be chamfered at an end 26' so that the actuating portion 102 comes into the groove 26 smoothly (refer to FIGS. 22 and 23).

Figure 24:
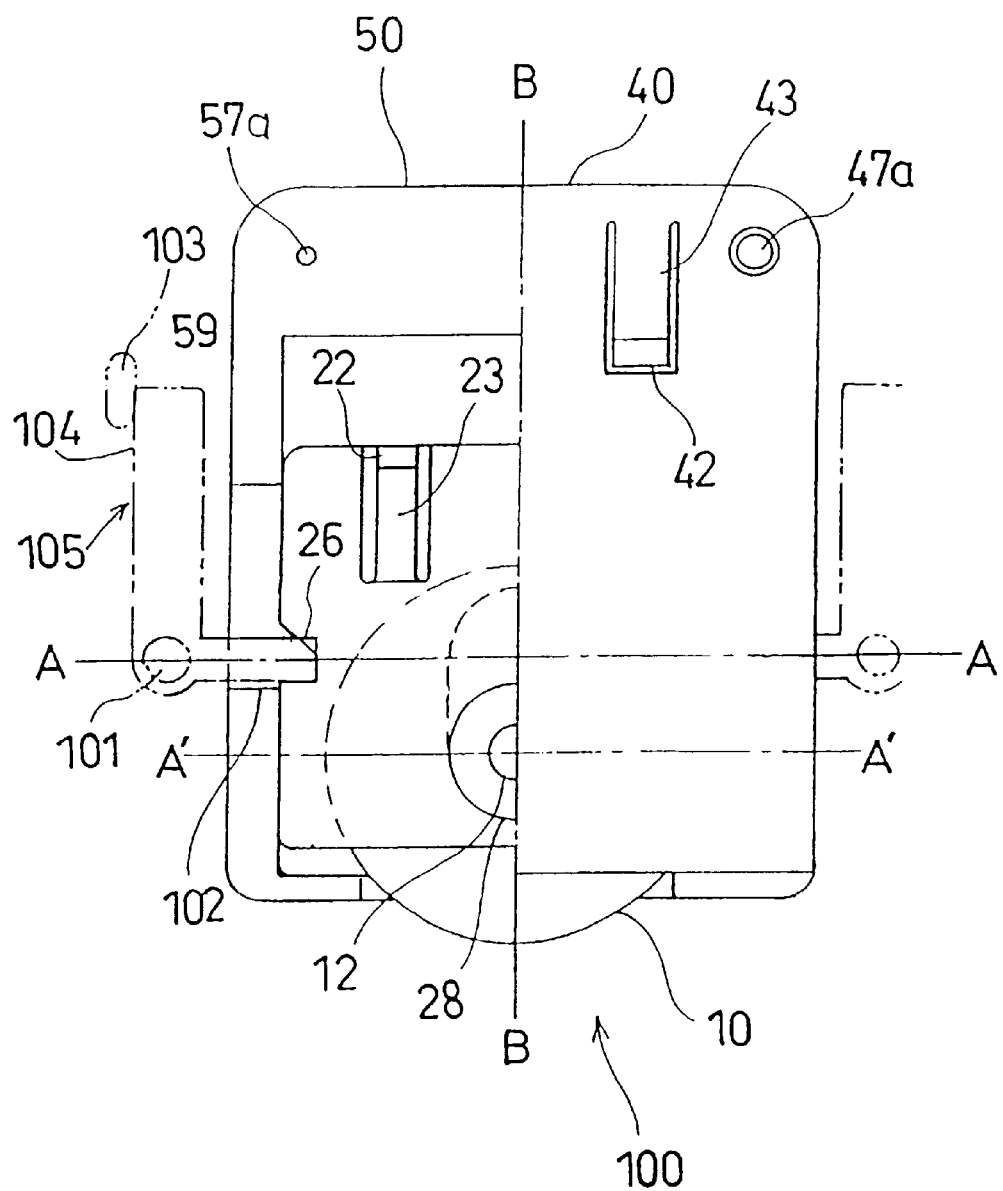
FIG. 24 is a front view of the cutter cassette in an operative state, according to the fourth embodiment, showing the cutter cassette divided left and right by the central axis B—B.

FIG. 24 is a front view of the cutter cassette 100 using the actuating rods 105 in an operative state. As described above, each of the actuating rods 105 is pivoted about the portion 101 to thereby engage the actuating portion 102 directly into the groove 26 on the side of the cutter case 60 through the opening 59. The cutter case 60 is moved downward in the case holder 70 in synchronization with the engaging action. Specifically, the center of the rotary blade 10 is moved downward from on the axis A—A onto the axis A'—A', thereby shifting the cutter cassette 100 from an inoperative state to an operative state.

In order to ensure the engagement between the actuating portion 102 and the groove 26 at a fixed position, a protrusion 103 may be formed in the cutting device 500. More specifically, the operating portion 104 of the actuating rod 105, which is opposite to the actuating portion 102, is brought into engagement with the protrusion 103, thereby fixing the cutter cassette 100 in an operative state. A description regarding the cutting device 500 will be described later.

Subsequently, a fifth embodiment of the invention will be described with reference to FIGS. 25 to 27.

As described above, this embodiment adopts the same mechanism as that of the first embodiment as a holding mechanism and a release mechanism. Therefore, a description regarding the holding mechanism and the release mechanism will be omitted. However, an extending mechanism is modified in this embodiment. Specifically, actuating rods are disposed on opposite sides of the cutter cassette 100 as an extending mechanism. Only the modified extending mechanism will be described hereinbelow to avoid overlaps of description.

Figure 25:
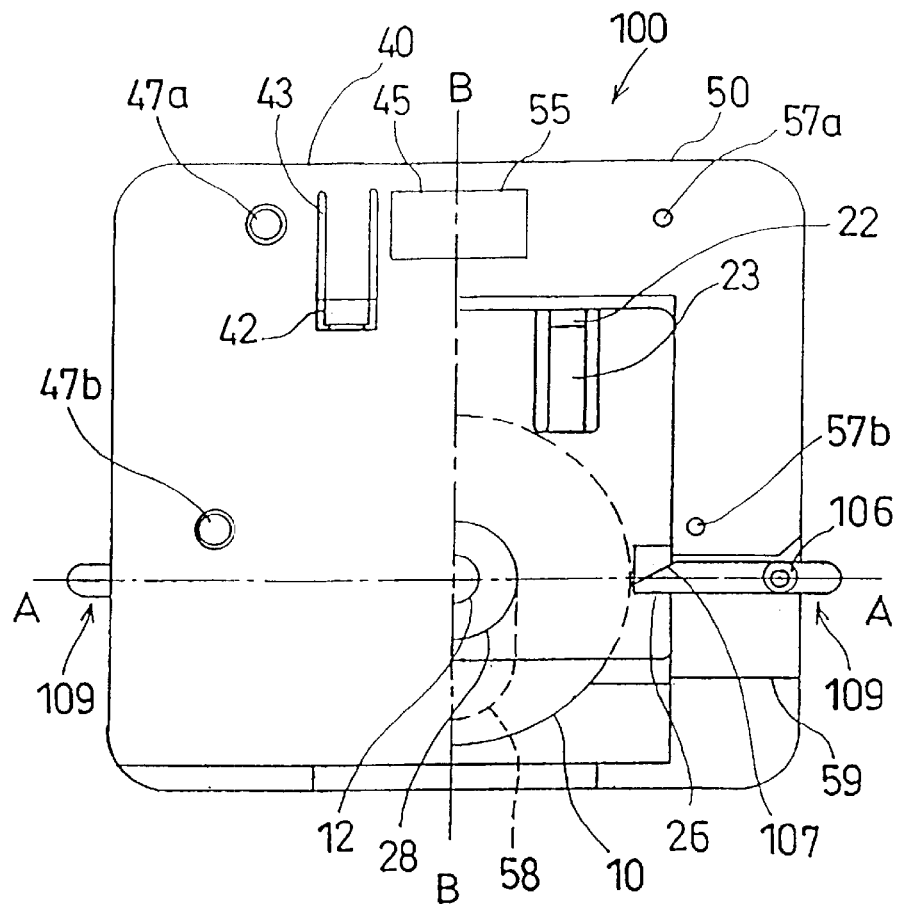
FIG. 25 is a front view of a cutter cassette in an inoperative state, according to a fifth embodiment, showing the cutter cassette divided left and right by the central axis B—B.
Figure 26:
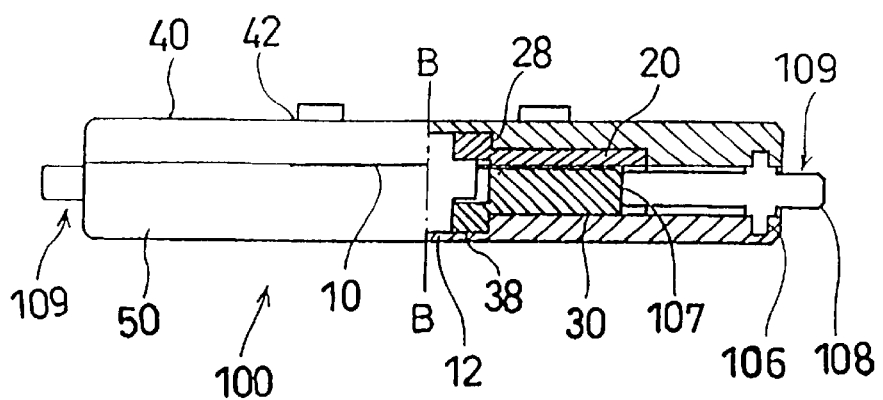
FIG. 26 is a plan view of the cutter cassette in an inoperative state, according to the fifth embodiment, showing the cutter cassette divided left and right by the central axis B—B.

In this embodiment, preferably, actuating rods 109 are disposed on opposite sides of the cutter cassette 100, as shown in FIG. 25. Specifically, the straight actuating rods 109 are each disposed pivotally about the portion 106. Each of the actuating rods 109 has an actuating portion 107 for extending operation at an end thereof. The actuating rod 109 is pivoted about the portion 106, so that the actuating portion 107 is engaged with the groove 26 of the cutter case 60 in the case holder 70.

Therefore, as shown in FIG. 25, the case holder 70 has the openings 59 formed on opposite sides thereof so that the cutter case 60 in the case holder 70 faces the exterior directly. Since the cutter case 60 has bilaterally symmetrical grooves 26 for engaging with the actuating portions 107 at positions to face the exterior through the opposite openings 59. A front view of FIG. 25 corresponds to a plan view of FIG. 26. Preferably, the actuating portions 107 are chamfered in order that they come into the grooves 26 smoothly (refer to FIG. 25).

Figure 27:
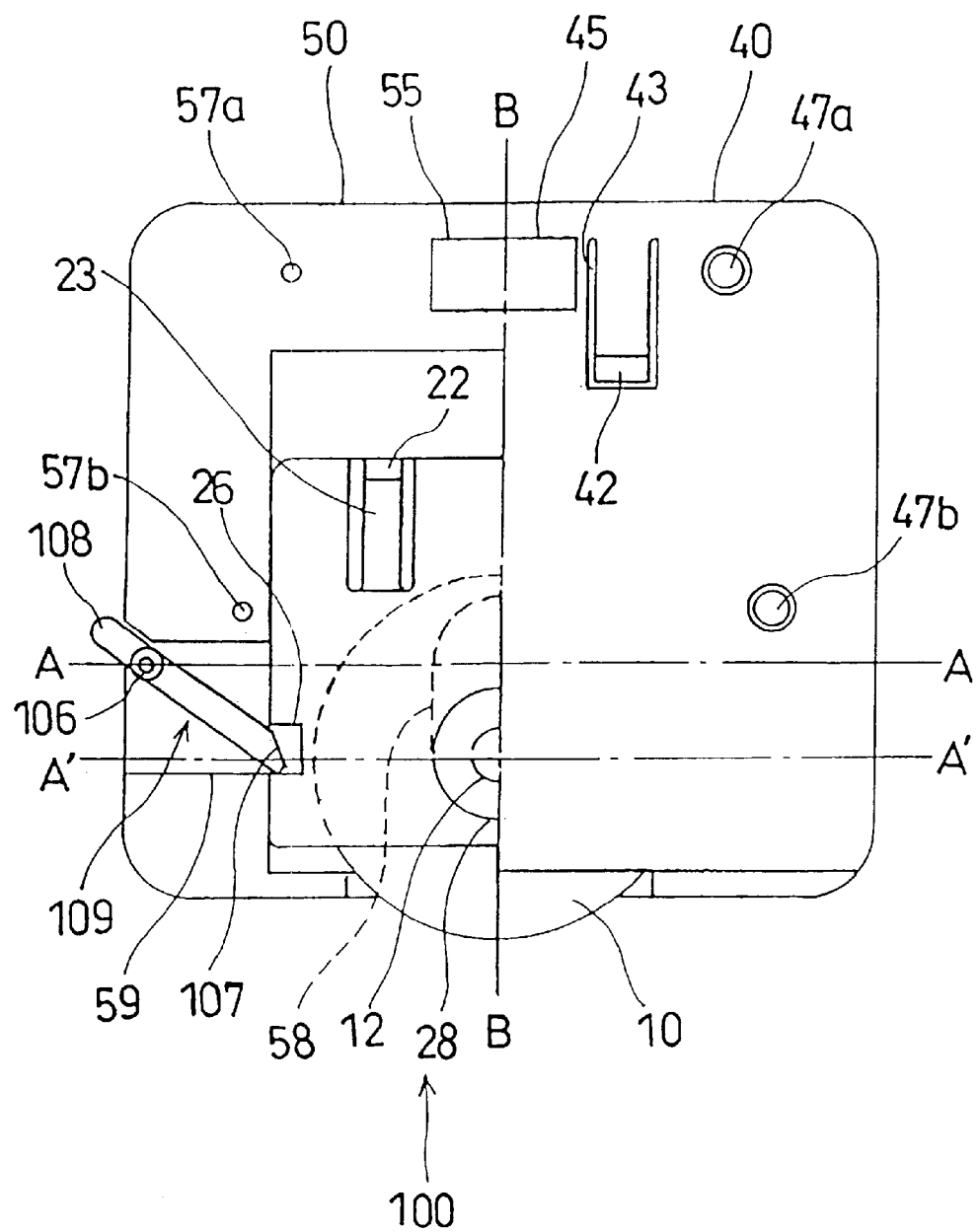
FIG. 27 is a front view of the cutter cassette in an operative state, according to the fifth embodiment, showing the cutter cassette divided left and right by the central axis B—B.

FIG. 27 shows the cutter cassette 100 using the actuating rods 109 in an operative state. As described above, each actuating rod 109 is pivoted about the portion 106, thereby engaging the actuating portion 107 into the groove 26 on the side of the cutter case 60 through the opening 59. The cutter case 60 is moved downward in the case holder 70 in synchronization with the engaging action.

In order to ensure the engagement between the actuating portion 107 and the groove 26, an operating portion 108 is formed at an opposite end of the actuating rod 109 from the actuating portion 107 (refer to FIG. 27). More specifically, the actuating portion 107 is engaged with the groove 26 by vertically moving the operating portion 108. As shown in FIG. 13, the holder 71 is formed in the cutting device, with which the operating portion 108 is engaged, so that the vertical movement of the operating portion 108 may be synchronized with the movement of the holder 71.

Alternatively, there is a driving mechanism used for the cutter cassette 100 according to the invention, which has a cam groove formed in the cutting device. More specifically, the cutter cassette 100 has a protrusion formed on the exterior thereof and connected with the cutting blade 10, and the cutting device has a cam groove formed therein for guiding the protrusion, thereby extending the cutting blade 10 outwardly in synchronization with the pushing motion of the cutter cassette 100 into the cutting device (not shown).

Furthermore, there is a driving mechanism used for the cutter cassette 100 according to the invention, which has gears in place of the second rack pair 36 (refer to FIG. 1 or 3) disposed at the cutter case 60 and has a rack mechanism in place of the gear mechanism 96 (refer to FIG. 13) disposed in the cutting device, which are engaged with each other. In other words, when the cutter cassette 100 is mounted in the cutting device, the gears integrated with the cutter case 60 are driven by the racks provided in the cutting device and the traveling distance of the cutter case 60 is increased as compared with that of the case holder 70, thereby extending the cutting blade 10 outwardly (not shown).

Furthermore, there is also a manual mechanism as a driving mechanism used for the cutter cassette 100 according to the invention. In this case, the cutting device has openings facing the openings of the cutter cassette 100, through which the cutter case 60 in the cutter cassette 100 is handled, thereby extending the cutting blade 10 outwardly (not shown).

As described above, the cutter cassette 100 according to the invention includes at least the cutting blade 10 and, preferably, includes the cutter case 60, the case holder 70, the holding mechanism, the release mechanism, and the extending mechanism. As a holding mechanism, a protrusion, a plate spring, a magnet, implanted hair, or the like is used for engagement. A rack, a gear, a link, a lever, or a cam is used as an extending mechanism. The release mechanism may also be used as an extending mechanism. The cutter cassette 100 according to the invention may not particularly use the cutter case 60 for extending the inner cutting blade outwardly. In other words, the case holder 70 may directly and slidably include a cutting blade therein for performing the function according to the invention.

There are a cutting device having a rail and a slider on a base, a hand-operated portable cutter of compact size, and the like for cutting using the cutter cassette 100. While the cutting device will be specifically described hereinafter, the configuration of the cutter cassette 100 according to the invention similarly applies to the hand-operated cutter.

Referring to FIGS. 28 to 38, the cutting device according to the embodiments of the invention will be described. The cutting device will be described principally with regard to a mechanism using a rack and a gear as an extending mechanism and to a mechanism including three protrusions as a holding and a release mechanism. However, it is also possible to introduce an actuating rod for a link mechanism, a lever mechanism, or a cam mechanism as an extending mechanism, and at least one of external mechanisms such as a cam groove as an inner mechanism of the cutting device. Furthermore, a structure using a spring, a magnet, or implanted hair may also be adopted as a holding mechanism. Here, only one embodiment will be described in order to avoid overlaps of description and the other mechanisms will follow this embodiment.

Figure 28:
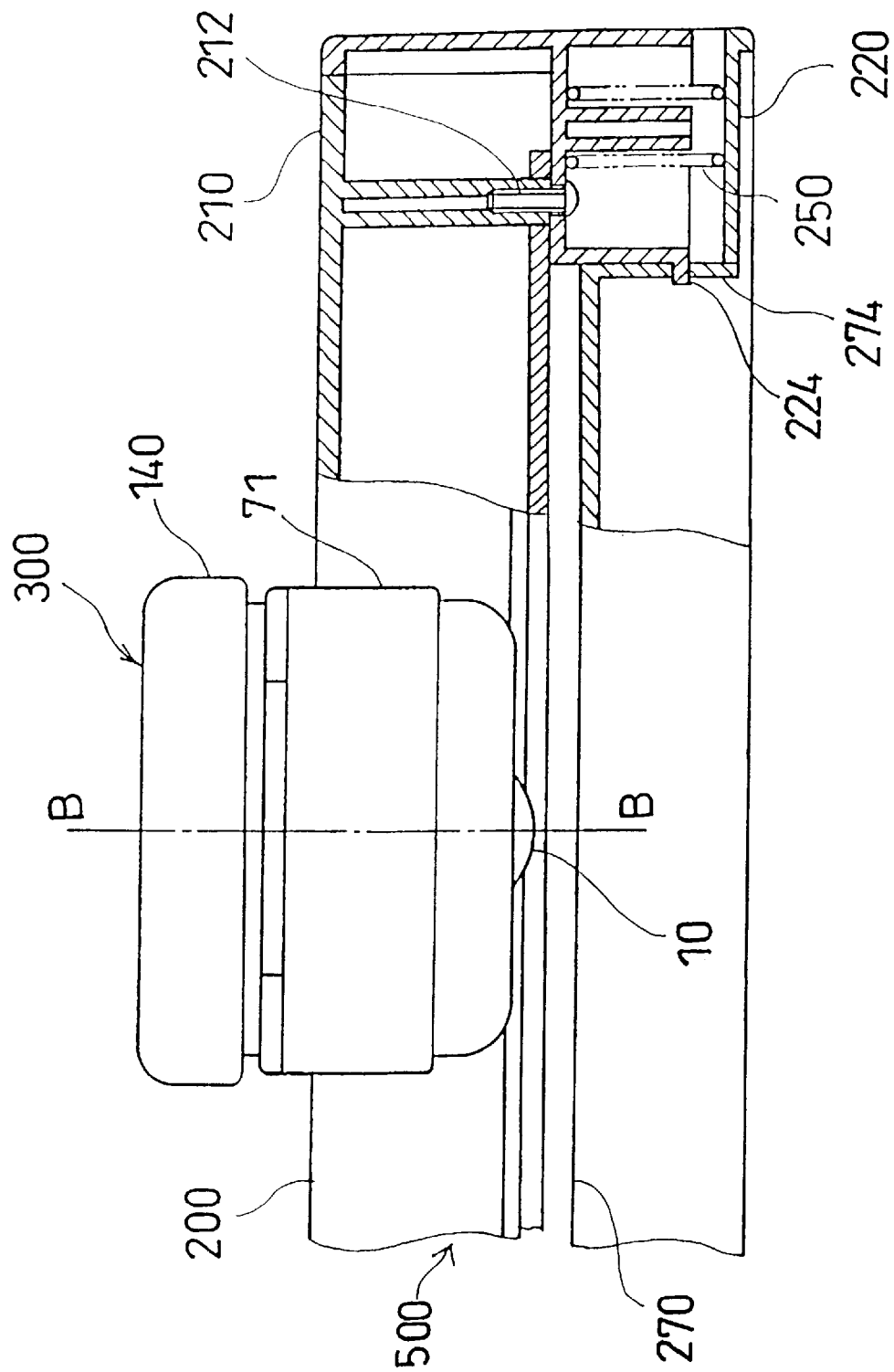
FIG. 28 is a front view, partly in section, of a cutting device according to the first embodiment.
Figure 29:
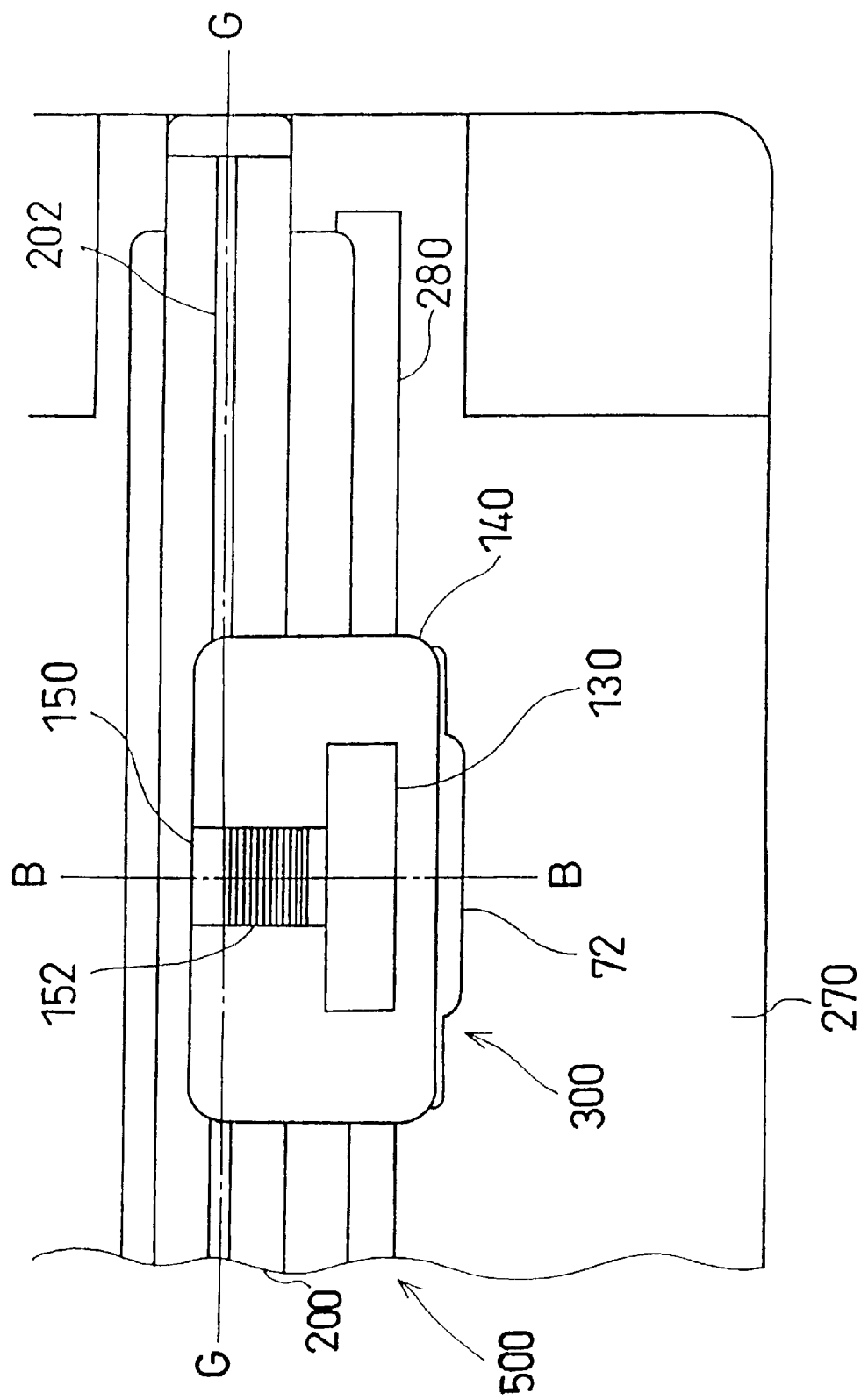
FIG. 29 is a plan view of the cutting device using the cutter cassette according to the first embodiment.

FIG. 28 is a front view of the cutting device 500 according to the embodiments of the invention. In a preferred embodiment, the rotary blade 10 is used as a cutting blade 10 such that it is protruded along the central axis B—B of a slider 300. As shown in FIG. 29, the slider 300, to which the cutter cassette is mounted, moves rectilinearly on the axis G—G of a rail 200.

Figure 30:
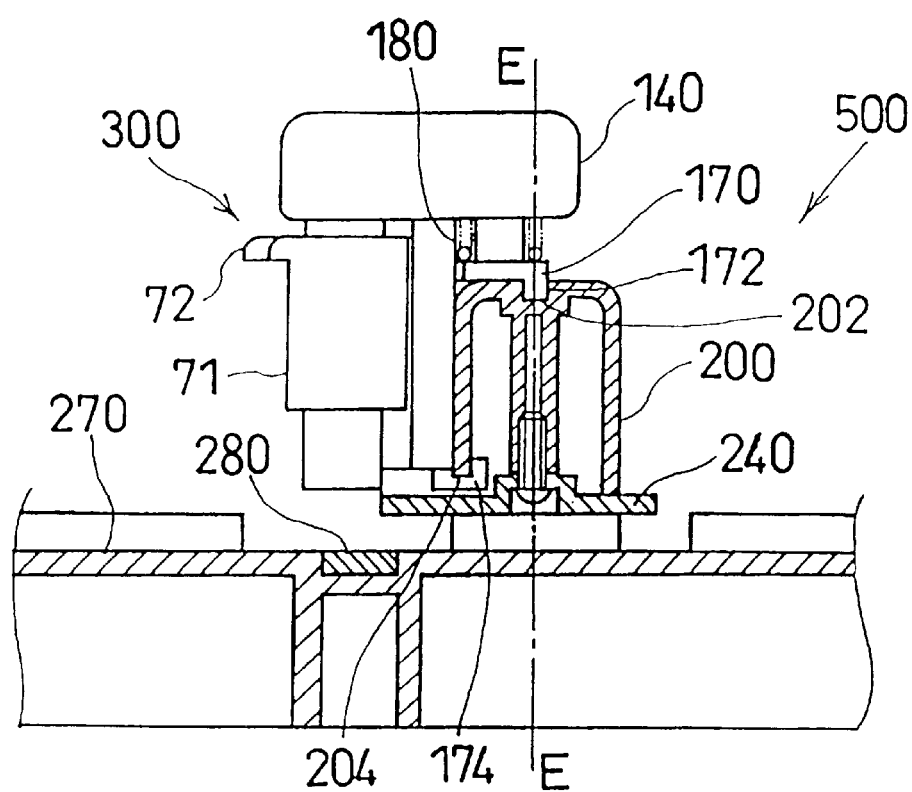
FIG. 30 is a side view of the cutting device using the cutter cassette according to the first embodiment, also showing a slider in section.

Referring to FIG. 28, a holding portion 210 for the rail 200 is provided at one end of a base 270 and, as shown in a side view of FIG. 30, sliding portions 170 and 174 are provided between the rail 200 and the slider 300. The sliding portion 170 is moved along the rail 200 while sandwiching it to thereby move the slider 300 mounted to the sliding portion 170 along the rail 200, thereby cutting paper or the like while rotating the rotary blade 10. A protrusion 224 under the holding portion 210 is engaged with a side 274 of the base 270 to hold the rail 200 on the base 270. Furthermore, a spring member 250 is interposed between the holding portion 210 for holding the rail 200 and the base 270 to push the rail 200 with the spring of the spring member 250. A retaining plate for fixing the paper on the base 270 may be provided under the rail 200.

FIG. 29 is a plan view of the slider 300. As shown in the drawing, the slider 300 has a mounting portion 130 thereon, on which the cutter cassette 100 is detachably mounted. Since the mounting portion 130 is opened at the top of the top cover 140, the cutter cassette 100 mounted in the slider 300 can be discriminated irrespective of whether it is in an operative state or in an inoperative state. With such a configuration, when the cutting device is used as office equipment, the types of various cutting blades such as a waveform blade and a perforating blade can be discriminated immediately. It is possible to give color for discrimination or attach a discriminating label or the like onto the cutter cassette 100 to be used.

Figure 38A:
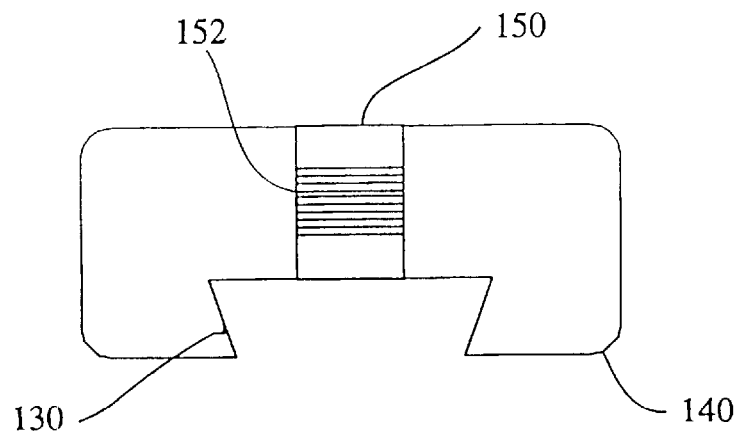
FIGS. 38A to 38C are plan views of other embodiments of a mount of the slider shown in FIG. 29.
Figure 38B:
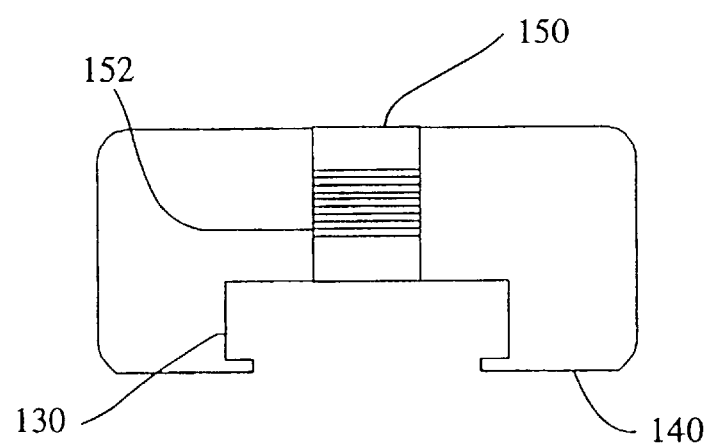
Figure 38C:
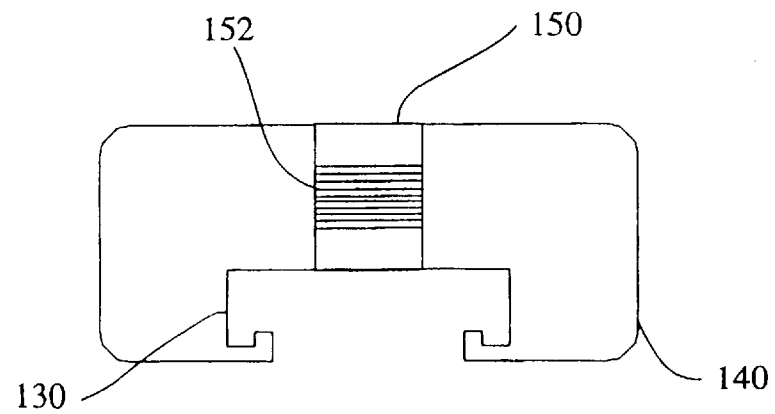

In the preferred embodiment, although the mounting portion 130 is formed as an opening surrounded from every direction as viewed from the above, as shown in FIG. 29, it may be formed to open one of all sides as viewed from the above. Specifically, the mounting portion 130 may be formed in a dovetail shape, as shown in FIG. 38A; alternatively, it may be formed to open to one side, as shown in FIG. 38B; and it may also be formed in a shape shown in FIG. 38C. In addition, the shape of the mounting portion 130 may be modified while maintaining the function for mounting the cutter cassette 100.

Figure 31:
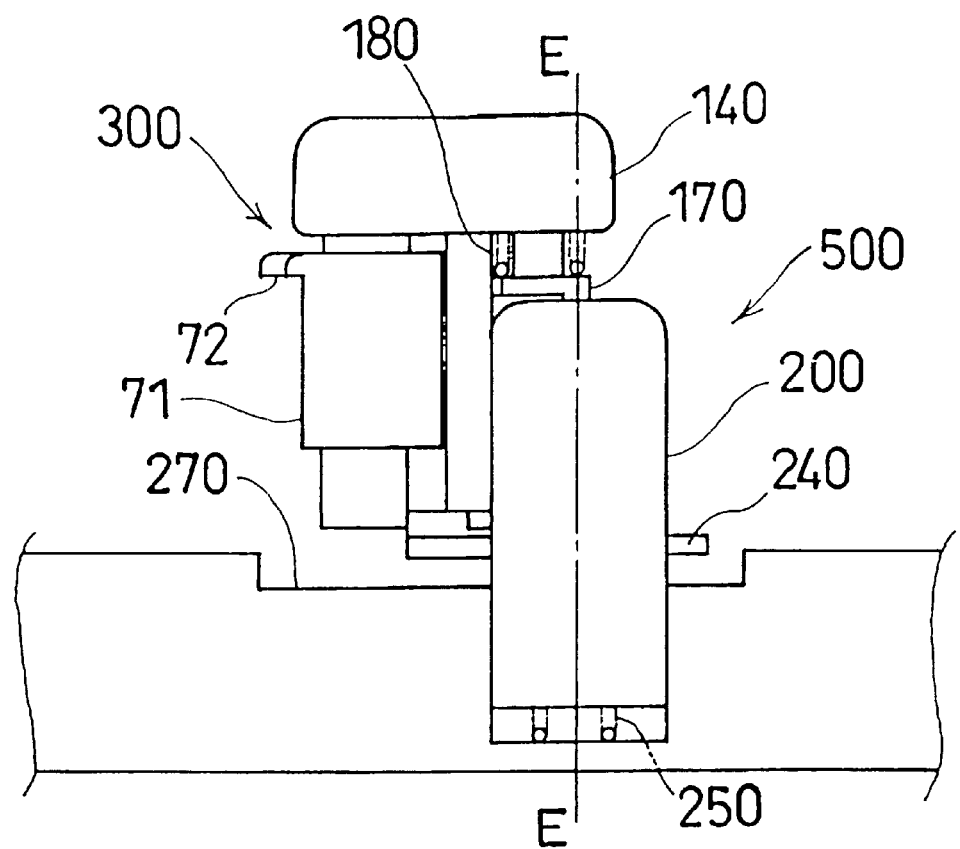
FIG. 31 is a side view of the cutting device using the cutter cassette according to the first embodiment.

FIGS. 30 and 31 are side views of the slider 300 according to an embodiment. As is evident from FIG. 30, an engaging portion 172 of the sliding portion 170 is slidably disposed in a groove 202 extending longitudinally at the center of the rail 200. The groove 202 and the engaging portion 172 are arranged in a row on the axis E—E. The sliding portion 174 of the slider 300 is engaged with a protrusion 204 at the lower part of the rail 200, and the slider 300 is thereby positioned vertically. The slider 300 may be mounted on the rail 200 with other mechanisms. A cutter mat 280 is provided at a designated place on the base 270, thereby preventing direct contact of the cutting blade 10 with the base 270. A spring member 180 is placed between the top cover 140 and the sliding portion 170 to push the top cover 140 downward from the above when cutting, thereby moving the slider 300 downward to bring the rotary blade 10 into contact with paper.

In the invention, the slider 300 of the cutting device 500 is configured assuming the use of the cutter cassette 100. Referring to FIGS. 32 to 38, the inner structure of the slider 300 to which the cutter cassette 100 is mounted therein for use will be described.

Figure 32:
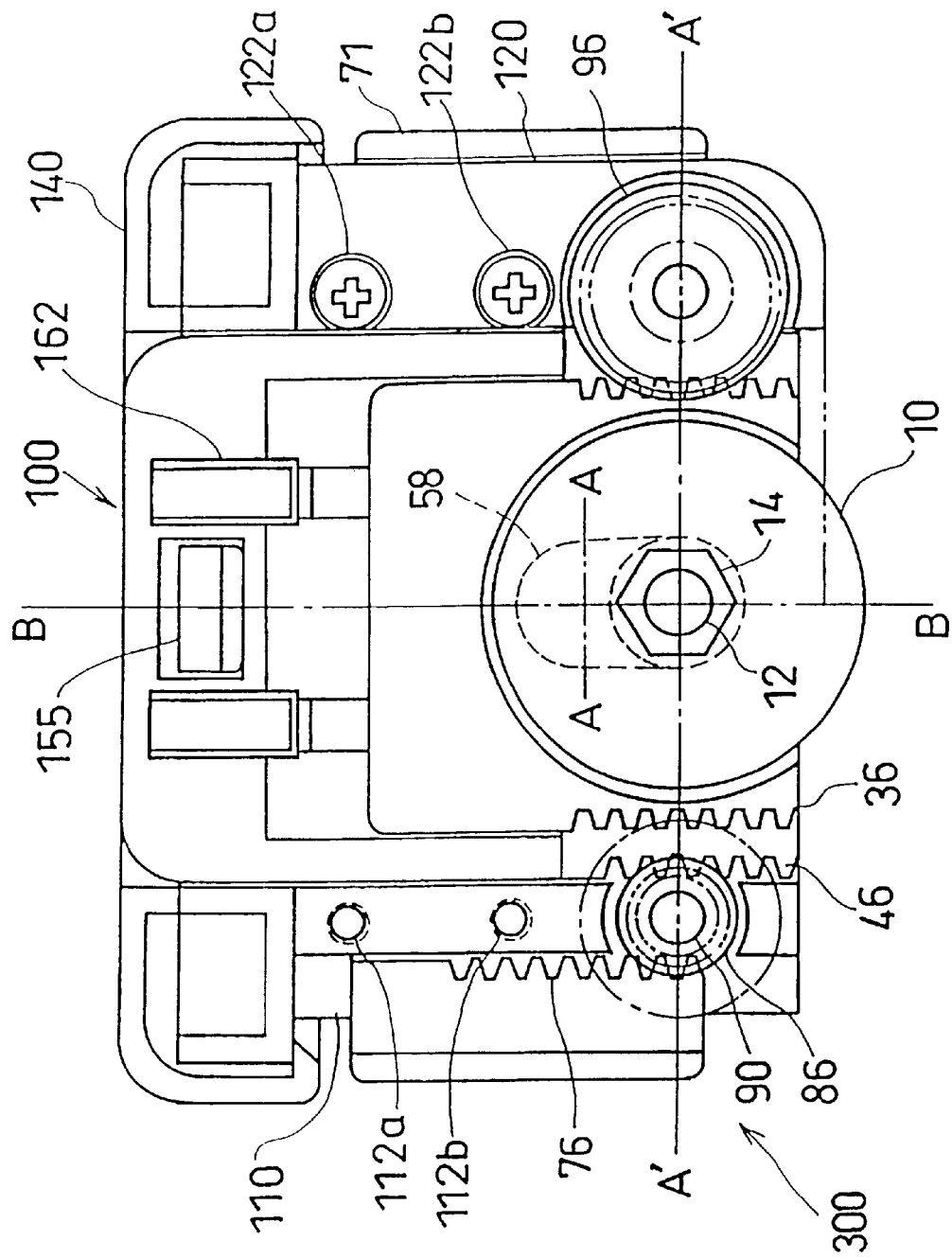
FIG. 32 is a sectional view taken along the center line, showing a state in which the cutter cassette is mounted to the slider of the cutting device, shown in FIG. 28.

FIG. 32 is a front view of the slider 300 according to the first embodiment of the invention. However, the drawing is divided left and right, and integral parts including the rotary blade 10 are shown in perspective for the purpose of a clear understanding. A housing portion of the slider 300 for the cutter cassette 100 includes gears, preferably, a gear mechanism including a double gear at positions facing opposite sides of the cutter cassette 100. However, when the cutter cassette 100 is operated by a lever mechanism as an extending mechanism, the corresponding cutting device 500 also has a lever mechanism in place of the gear mechanism in the slider 300. More specifically, a mechanism using the actuating rod, shown in FIGS. 18 to 24, may be provided. Alternatively, a cam groove or the like for extending the cutting blade 10 housed in the cutter cassette 100 may be provided within the scope of the claims according to the invention.

In the first embodiment, the case holder 70 constituting the cutter cassette 100 includes the rack pair 46 at opposite sides thereof, thereby engaging with the double gear pair 86, and the cutter case 60 holding the rotary blade 10 includes the rack pair 36 at opposite sides thereof, thereby engaging with the double gear pair 96 (refer to FIG. 13). The gear pairs 86 and 96 constituting the double gear, and the shaft 90 are positioned so as to be sandwiched by cutter-cassette supporting portions 110 and 120 from the front and the back (refer to FIG. 34). As shown in FIG. 32, the cutter cassette supporting portions 110 and 120 are joined by screws at portions 112a, 112b, 122a, and 122b. The shaft 90 is fixed, so that the gear pairs 86 and 96 are rotated while being held in position at all times and thus the engaging rack pairs 36 and 46 are moved vertically. The center points of the gear pairs 86 and 96 are positioned on the axis A'—A' at which the center of the rotary blade 10 in an operative state is positioned. When the center point of the rotary blade 10 is positioned on this axis, a portion of the rotary blade 10 protrudes outwardly from the cutter cassette 100, thereby cutting paper by handling the slider 300. The axis A—A in the drawing indicates the center of the rotary blade 10 in an inoperative state. The axis A—A of FIG. 32 corresponds to the axis A—A of FIG. 4 (or FIG. 14). The axis A'—A' of FIG. 32 corresponds to the axis A'—A' of FIG. 5 (or FIG. 15).

Figure 33:
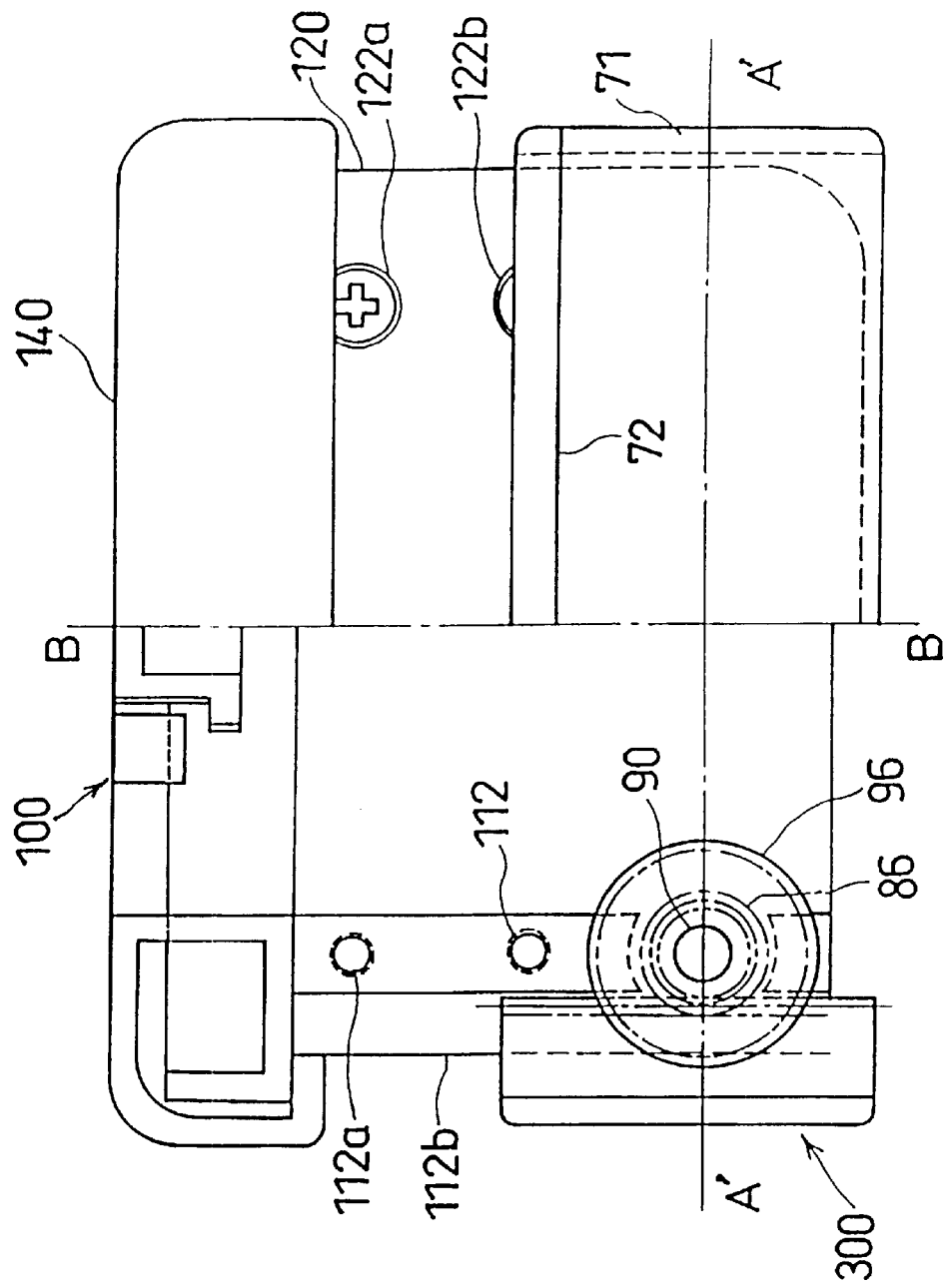
FIG. 33 is a rear elevation of the slider, shown in FIG. 32, which is divided left and right.
Figure 34:
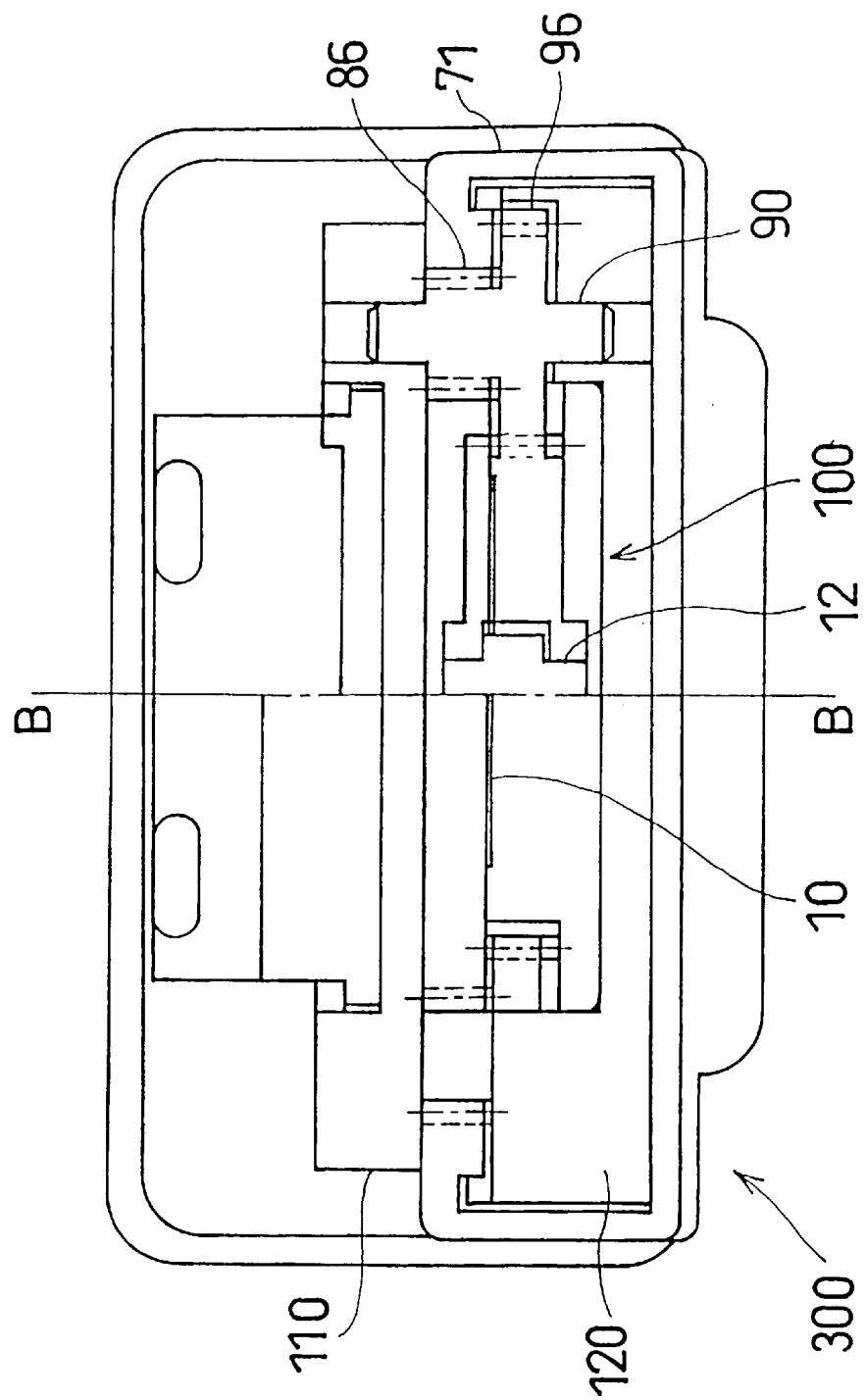
FIG. 34 is a plan view of the slider, shown in FIG. 32, which is divided left and right.

As shown in FIGS. 32 and 33, the top cover 140 is disposed to cover the cutter-cassette supporting portions 110 and 120, and the holder 71 for taking out the cutter cassette 100 is disposed under the top cover 140 such that it is slidable in the vertical direction. The holder 71 does not move upwardly over the top cover 140 in general. The holder 71 is engaged with the double gear pair 86 to rotate it, thereby rotating the double gear pair 96 held on the same shaft 90 in the same direction. The gear pairs 86 and 96 can be arranged adjacent to each other on the shaft 90, as shown in FIG. 34. The gears may be arranged in reverse order in front and rear. Also, such gears may be formed integrally with a corresponding shaft, may be attached by key grooves, and may be attached by an involute spline or the like. Furthermore, such gears may constitute a gear train along with other gears.

Figure 35:
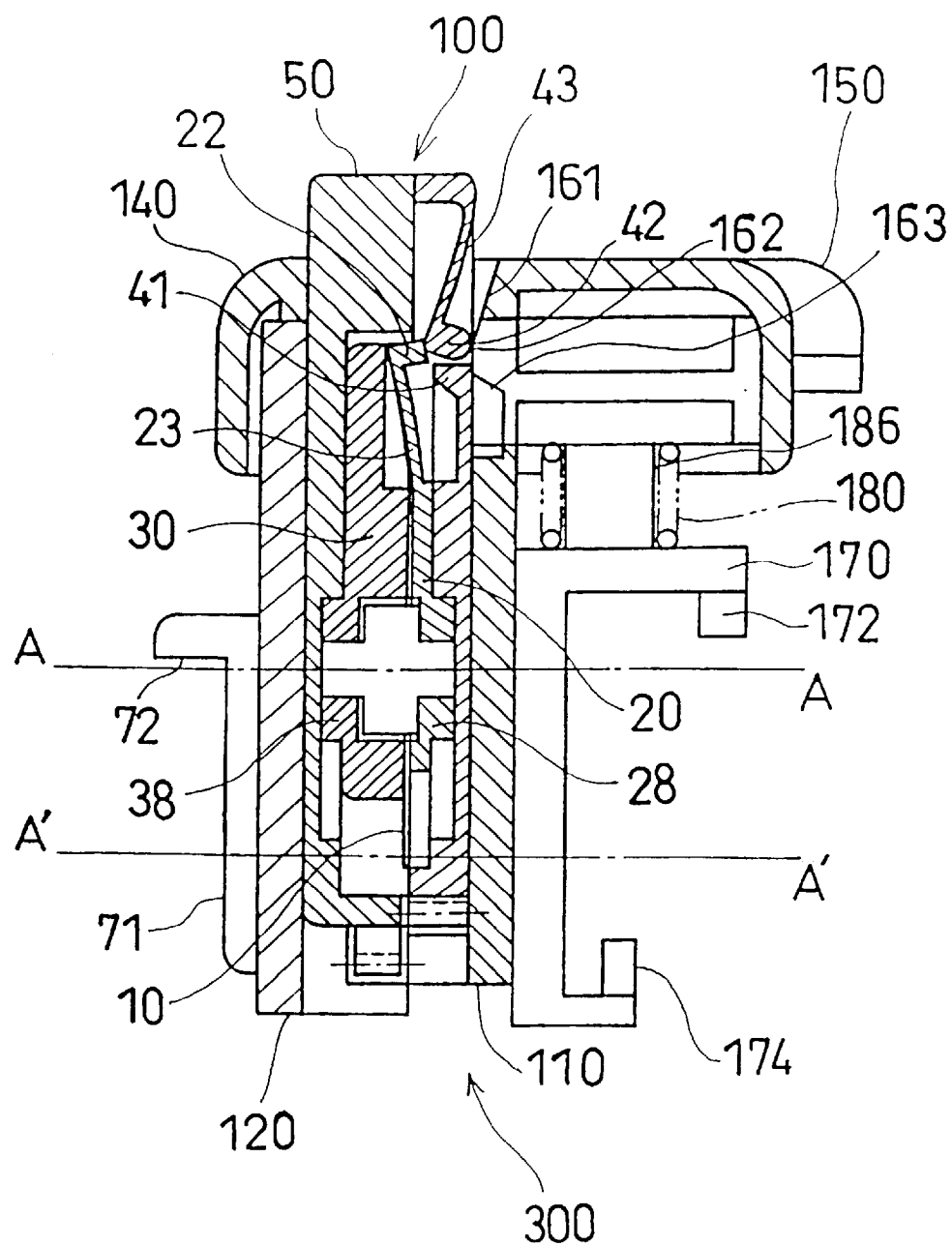
FIG. 35 is a sectional side view of the slider, shown in FIG. 32, during insertion of the cutter cassette.
Figure 36:
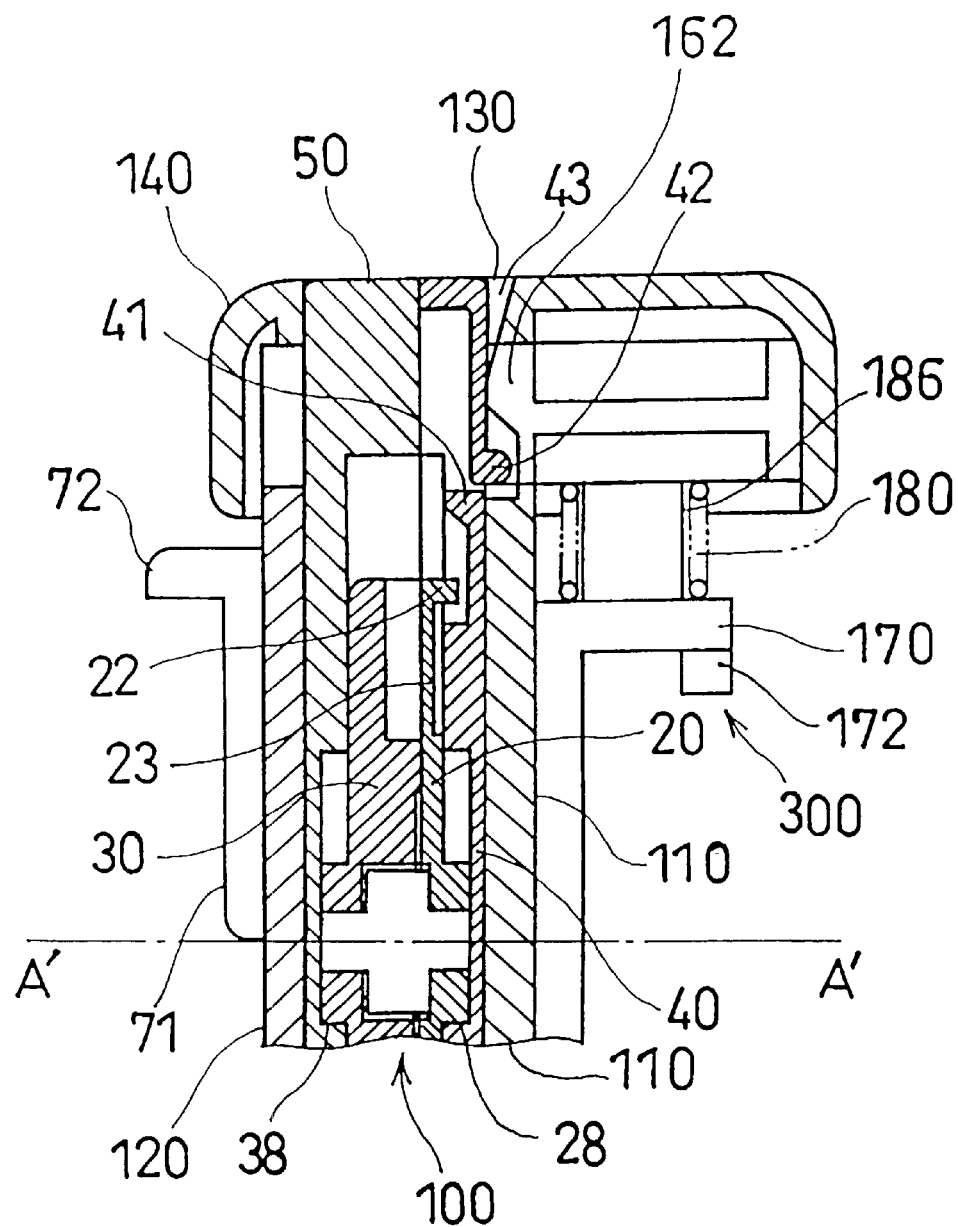
FIG. 36 is a sectional side view of the slider, shown in FIG. 32, when being mounted.
Figure 37:
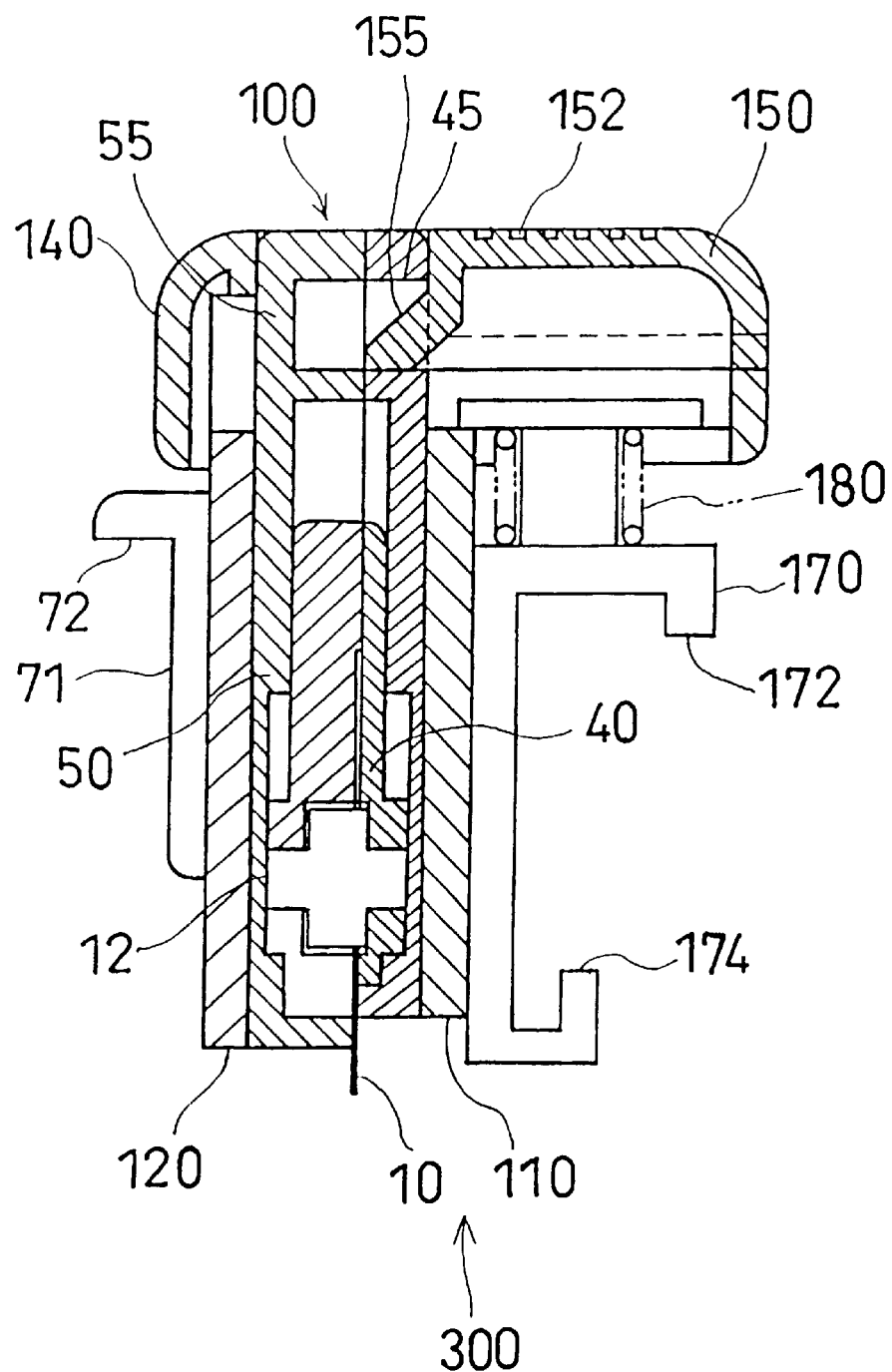
FIG. 37 is a sectional side view of the slider, shown in FIG. 32, showing a position to which a cassette stopper is mounted.

Referring now to FIGS. 35 to 37, a detailed description of attachment of the cutter cassette 100 to the mounting portion 130 of the slider 300.

As shown in FIG. 35, the cutter cassette 100 in an inoperative state, into which the rotary blade 10 is inserted, is inserted through the mounting portion 130 (refer to FIG. 29) formed between the front and rear cutter-cassette supporting portions 110 and 120. The cutter-cassette supporting portion 110 includes protrusions 162 for pushing the third protrusions 42 (refer to FIG. 1) of the cutter cassette 100 inwardly at portions facing the cutter cassette 100. In other words, when the cutter cassette 100 is pushed into the slider 300 through the mounting portion 130, each third protrusion 42 protruding to the exterior of the case holder 70 is first guided on an inclined plane 161 which is gradually inclined inwardly. Subsequently, the third protrusion 42 is pushed into the case holder 70 by a protrusion 162 in the slider 300 and is held therein. At that time, in the case holder 70, the first protrusion 22 of the cutter case 60 and the second protrusion 41 of the case holder 70 are disengaged from each other by the pressure from the third protrusions 42 (refer to FIG. 35). Furthermore, as shown in FIG. 36, after the third protrusion 42 has been pushed inwardly by the protrusion 162 in the slider 300, it is guided on a steep inclined plane 163 and returns to the initial state. At this time, the first protrusion 22 comes down below the second protrusion 41, thereby shifting the rotary blade 10 into an operative state. Accordingly, by pushing the cutter cassette 100 from the above into the mounting portion 130 of the slider 300, the rotary blade 10 can be synchronously protruded outwardly from the cutter cassette 100. Therefore, according to the invention, the cutting blade is housed completely in the cutter cassette, thereby providing a high degree of safety, and a blade interchanging work is performed only by pushing operation from the above, thereby improving the operability dramatically. Accordingly, although the cutting blade is normally interchanged by troublesome work while a portion of the blade is exposed in the conventional art, the invention effectively solves the above problems of poor safety and troublesome operability.

When using a hand-operated cutter as a cutting device, the operation of pushing the cutter cassette into the cutting device and the operation of extending the cutting blade may not be connected with each other. For example, when the cutter cassette 100 shown in FIG. 3 is used, an extending mechanism is not provided on the sides of the case holder 70, but only on the sides of the inner cutter case 60. Therefore, it is also possible that the cutter cassette 100 be mounted in the cutting device at the first stage, and the extending mechanism of the cutter case 60 be operated using the driving mechanism provided for the cutting device, thereby extending the cutting blade 10.

The pressure of the protrusion 162 in the slider 300, shown in FIG. 35, to the cutter cassette 100 satisfies the force F, shown in FIG. 7. When the holding mechanism and the release mechanism of the cutter cassette 100 are formed of an elastic body such as a spring 1 (refer to FIG. 14) or the like, only the extending mechanism is used to shift the cutting blade 10 into an operative state in place of the pressure of the protrusion 162 in the slider 300 to the cutter cassette 100.

There is a need for the cutter cassette 100 to be fixed in position in order to properly use the rotary blade 10 for cutting when the cutter cassette 100 is shifted to an operative state. For this purpose, as shown in FIGS. 29 and 37, the slider 300 includes a cutter cassette stopper 150 at the top of the top cover 140 and adjacent to the mounting portion 130. The cutter cassette stopper 150 is slidable toward the mounting portion 130 and includes a protrusion 155 on the side facing the mounting portion 130. In other words, the cutter cassette stopper 150 is a predetermined distance away from the mounting portion 130 before pushing the cutter cassette 100 into the mounting portion 130, thereby allowing the cutter cassette 100 to be smoothly inserted in the mounting portion 130 without any troubles. After the cutter cassette 100 has been pushed into the slider 300 and is shifted to an operative state to protrude the rotary blade 10, the cutter cassette stopper 150 is slid toward the mounting portion 130, thereby inserting the protrusion 155 into the hollows 45 and 55 at the front upper part of the cutter cassette 100, as shown in FIG. 37. Accordingly, the cutter cassette 100 is held in an operative state while being positioned, thereby allowing cutting work to be performed with stability. The cutter cassette stopper 150 according to the embodiment of the invention has a plurality of shallow grooves 152 for sliding formed at the top thereof, thereby improving sliding operability by hand. The operability can be improved using alternative suitable members. The cutter cassette stopper 150 may be operated by hand in accordance with the state of mount/demount of the cutter cassette 100, or may be operated automatically.

The cutter cassette stopper 150 may be pivotal. Particularly, when the cutter cassette 100 is operated using the actuating rod 9 of the cutting device, as shown in FIG. 18, the actuating rod 9 may be used in place of the cutter cassette stopper 150.

A shift from an operative state to an inoperative state of the cutter cassette 100 is performed by the reverse operation from the above operation. As shown in FIG. 30, rack levers 72 are provided on the back of the holder 71 having the third rack pair 76 on the left and right. The rack levers 72 protrude outwardly and perpendicularly from the back of the holder 71, thereby improving the operability. It is possible to modify the rack lever 72 into a shape which is easily gripped to enhance the usability. When the rotary blade 10 is in an operative state, the rack lever 72 is moved upwardly as the cutter cassette 100 is pushed. By pushing the rack lever 72 downward, the gear pair 86 engaging with the third rack pair 76 of the rack lever 72 is rotated backwardly, thereby bringing the cutter case 60 into the case holder 70 and also moving the cutter cassette 100 upwardly for ejection. In this case, the cutter cassette stopper 150 is removed.

The base 270 may include a cutter-cassette mounting portion (not shown) for housing a plurality of the cutter cassettes 100. This is for the purpose of promptly ejecting the cutter cassettes 100 having a plurality of the cutting blades 10 to be used for the cutting device 500 for interchanging. The cutter-cassette mounting portion can be configured to be removable from the base 270. Repeatedly speaking, in the cutting device according to the invention, since the type of the cutting blade 10 can be checked in a state in which the cutter cassette 100 is mounted at the mounting portion 130 of the top cover 140 of the slider 300, the cutting blade 10 to be used can be promptly discriminated. Thus, the usability is enhanced by arranging the plurality of cutter cassettes 100 close to each other.

Since the invention is configured as described above, according to a first aspect of the invention, the cutting blade can be promptly extended from the cutter cassette when used, that is, in an operative state.

In the invention according to a second aspect of the invention, the cutting blade can be securely housed and held in the cutter cassette when not used, that is, in an inoperative state.

In the invention according to the first or the second aspect of the invention, the cutting blade can be housed in the cutter cassette in an inoperative state by using the holding mechanism, and the cutting blade in the cutter cassette can easily be extended in an operative state using the release mechanism and the extending mechanism, thereby improving safety and operability.

In the invention according to a third aspect of the invention, the cutting blade can easily be held in the case holder by using the cutter case, and greater flexibility of positioning operation in the case holder and also various functions can be provided by providing various functions on the outer surface of the cutter case.

In the invention according to the third aspect of the invention, by using the cutter case, in an inoperative state, the cutting blade can easily be housed in the cutter cassette by using the holding mechanism and, in an operative state, the cutting blade in the cutter cassette can be movably projected with greater flexibility of operation by using the release mechanism and the extending mechanism, thereby providing a cutter cassette having improved safety and operability.

In the cutter cassette according to the third aspect of the invention, the holding mechanism can be configured simply by using the two protrusions.

In the cutter cassette according to the third aspect of the invention, the release mechanism can be configured simply by using the three protrusions.

In the cutter cassette according to the third aspect of the invention, the holding mechanism can be configured simply by using the spring.

In the cutter cassette according to the third aspect of the invention, the holding mechanism can be configured simply by using the magnets.

In the cutter cassette according to the third aspect of the invention, the holding mechanism can be configured simply by using the implanted hair.

In the cutter cassette according to any one of the first to the third aspect of the invention, the extending mechanism of the cutter cassette according to the invention can extend the cutting blade by using the driving mechanism mounted to a cutting device. Furthermore, the cutting blade can be extended at the same time the cutter cassette according to the invention is mounted to the cutting device.

In the cutter cassette according to any one of the first to the third aspect of the invention, the extending mechanism can be operated promptly by using the driving mechanism through the opening.

In the cutter cassette according to any one of the first to the third aspect of the invention, the cutting blade can be extended by operating the extending mechanism by using the cutter cassette in combination with the driving mechanism using a gear mechanism of the cutting device.

In the cutter cassette according to any one of the first to the third aspect of the invention, the extending mechanism is operated by using the cutter cassette in combination with the driving mechanism using the gear mechanism of the cutting device to thereby increase the traveling distance of the cutter case as compared with that of the case holder, thereby extending the cutting blade.

In the cutter cassette according to any one of the first to the third aspect of the invention, safe operation of the cutter cassette can be ensured when used and cutting operation can be performed with stability.

In a cutting device using the cutter cassette according to any one of the first to the third aspect of the invention, when the cutter cassette is inserted into the cutting device, the cutter cassette is detachably housed in the cutting device, and can be promptly discriminated via the cutter-cassette mounting portion. Moreover, the cutting blade in the cutter cassette can be shifted to an operative state by using the driving mechanism when the cutter cassette is pushed in, thereby setting the cutting device into an operative state.

In the cutting device using the cutter cassette according to any one of the first to the third aspect of the invention, for example, a multistage gear is used as a driving mechanism, and the traveling distance of the inner cutter case is increased as compared with that of the case holder, thereby allowing the cutting blade to project.

In the cutting device using the cutter cassette according to any one of the first to the third aspect of the invention, for example, a multistage gear is used as a driving mechanism to extend the cutter case in the case holder after the cutter cassette has been mounted in the cutting device, thereby allowing the cutting blade to project.

In the cutting device using the cutter cassette according to any one of the first to the third aspect of the invention, by using the driving mechanism having the actuating rod in the cutting device, the cutter case is extended in the case holder after the cutter cassette has been mounted in the cutting device, thereby allowing the cutting blade to project. In this case, an engaging portion for positioning the cassette is unnecessary.

In the cutting device using the cutter cassette according to any one of the first to the third aspect of the invention, by using the driving mechanism having the actuating rod on the side of the cutter cassette, the cutting blade can be shifted to an operative state in synchronization with the operation of pushing the cutter cassette into the cutting device.

In the cutting device using the cutter cassette according to any one of the first to the third aspect of the invention, by using the cam groove provided in the cutting device as a driving mechanism, the cutting blade can be shifted to an operative state in synchronization with the operation of pushing the cutter cassette into the cutting device.

In the cutting device using the cutter cassette according to any one of the first to the third aspect of the invention, a complex driving mechanism is omitted, thereby providing a simple and economical cutting device.

What is claimed is:

1. A cutter cassette mechanism including a cutter cassette movably holding a cutting blade therein, comprising:
   a holding mechanism for holding the cutting blade therein in a completely inserted state;
   an extending mechanism for extending the cutting blade outwardly; and
   an opening on the outside surface for operating the extending mechanism by using an external driving mechanism,
   wherein the extending mechanism extends the cutting blade in synchronization with the external driving mechanism, the extending mechanism including a first rack formed on the side of a case holder and a second rack formed on the side of a cutter case, the first rack being formed in parallel with the opening formed on the side of the case holder, and the second rack being formed in parallel with the first rack and closer to the center of the cutting blade than the first rack so as to face the opening.

2. The cutter cassette mechanism according claim 1, further comprising an engaging portion with which a positioning member for positioning and fixing the cutter cassette in an operative state is engaged.

3. A cutting device including the cutter cassette mechanism according to claim 1, the cutting device comprising the external driving mechanism for shifting the cutting blade into an operative state when the cutter cassette is mounted to a cutter-cassette mounting portion.

4. The cutting device according to claim 3, wherein the external driving mechanism includes at least one gear, and extends the cutter case in the case holder in synchronization with the operation of pushing the cutter cassette, thereby shifting the cutting blade into an operative state.

5. The cutting device according to claim 4, wherein at least one holder is provided with sides facing the side face of the cutter cassette so that the holder is engaged with the at least one gear.

6. The cutting device according to claim 3, wherein the external driving mechanism includes at least one gear, and extends the cutter case in the case holder after the cutter cassette has been pushed in, thereby shifting the cutting blade into an operative state.

7. The cutting device according to claim 3, wherein the external driving mechanism includes an actuating rod in the cutting device, and extends the cutter case in the case holder after the cutter cassette has been pushed in, thereby shifting the cutting blade into an operative state.

8. The cutting device according to claim 3, wherein the external driving mechanism includes an actuating rod on the side of the cutter cassette, and extends the cutter case in the case holder in synchronization with the operation of pushing the cutter cassette, thereby shifting the cutting blade into an operative state.

9. The cutting device according to claim 3, wherein:
   the external driving mechanism is a cam groove provided in the cutting device; and
   the extending mechanism is a protrusion connected with a rotary blade provided on the cutter cassette; wherein the cam groove and the protrusion are engaged with each other in synchronization with the operation of pushing the cutter cassette, thereby shifting the cutting blade into an operative state.

10. The cutting device according to claim 3, wherein the external driving mechanism is driven manually.

11. A cutter cassette mechanism including a cutter cassette singly holding the cutting blade therein in a completely inserted state, comprising:

a holding mechanism for holding the cutting blade therein in a completely inserted state;

an extending mechanism for extending the cutting blade outwardly; and an opening on the outside surface for operating the extending mechanism by using an external driving mechanism, wherein the extending mechanism extends the cutting blade in synchronization with the external driving mechanism, the extending mechanism including a first rack formed on the side of a case holder and a second rack formed on the side of a cutter case, the first rack being formed in parallel with the opening formed on the side of the case holder, and the second rack being formed in parallel with the first rack and closer to the center of the cutting blade than the first rack so as to face the opening.

12. A cutter cassette mechanism including a cutter cassette comprising:

a cutter case for supporting a cutting blade;

a case holder for movably housing the cutter case therein;

a holding mechanism for holding the cutter case in the case holder in a completely inserted state;

an extending mechanism for extending the cutter case out from the case holder so as to project the cutting blade from the case holder; and an opening on the outside surface for operating the extending mechanism by using an external driving mechanism, wherein the extending mechanism includes a first rack formed on the side of the case holder and a second rack formed on the side of the cutter case, the first rack being formed in parallel with the opening formed on the side of the case holder, and the second rack being formed in parallel with the first rack and closer to the center of the cutting blade than the first rack so as to face the opening.

13. The cutter cassette mechanism according to claim 12, wherein:

the cutter case includes a first protrusion protruding outwardly; and the case holder includes a second protrusion protruding inwardly; wherein the first protrusion and the second protrusion are engaged with each other to form the holding mechanism for holding the cutter case in the case holder in a completely inserted state.

14. The cutter cassette mechanism according to claim 13, wherein the case holder further includes a third protrusion protruding outwardly or inwardly, pushes the first protrusion inwardly by the third protrusion, and disengages the first protrusion from the second protrusion, thereby constituting a release mechanism for releasing the holding mechanism.

15. The cutter cassette mechanism according to claim 12, wherein:

the holding mechanism is a spring engaged with the cutter case and the case holder; and the cutter case is held in the case holder in a completely inserted state by the elasticity of the spring.

16. The cutter cassette mechanism according to claim 12, wherein:

the holding mechanism is magnets each engaged with the cutter case and the case holder; and the cutter case is held in the case holder in a completely inserted state by the attraction of the magnets.

17. The cutter cassette mechanism according to claim 12, wherein:

the holding mechanism is implanted hair engaged with the cutter case and the case holder, and the cutter case is held in the case holder in a completely inserted state by the friction of the implanted hair.

* * * * *